(12) United States Patent
Riemensperger et al.

(10) Patent No.: US 12,338,534 B2
(45) Date of Patent: Jun. 24, 2025

(54) COATED ABRASIVE TOOL, METHOD FOR PRODUCING THE SAME AND ABRASIVE DENTAL PRODUCT

(71) Applicant: ecoCOAT GmbH, Allershausen (DE)

(72) Inventors: Reinhold Riemensperger, Allershausen (DE); Enrico Flade, Eching (DE)

(73) Assignee: ecoCOAT GmbH, Allershausen (DE)

( * ) Notice: Subject to any disclaimer, the term of this patent is extended or adjusted under 35 U.S.C. 154(b) by 438 days.

(21) Appl. No.: 17/502,892

(22) Filed: Oct. 15, 2021

(65) Prior Publication Data

US 2022/0033950 A1      Feb. 3, 2022

Related U.S. Application Data

(63) Continuation of application No. PCT/EP2020/060901, filed on Apr. 17, 2020.

(30) Foreign Application Priority Data

Apr. 18, 2019   (DE) .......................... 102019205745.4

(51) Int. Cl.
*A46B 9/00* (2006.01)
*A46B 9/04* (2006.01)
(Continued)

(52) U.S. Cl.
CPC ............... *C23C 4/04* (2013.01); *A46B 9/005* (2013.01); *A46B 9/04* (2013.01); *A61C 3/025* (2013.01);
(Continued)

(58) Field of Classification Search
CPC .. B24D 3/00; B24D 3/007; A46B 9/04; A46B 2200/00; A46B 2200/1066;
(Continued)

(56) References Cited

U.S. PATENT DOCUMENTS 2,712,987 A    7/1955  Storrs et al.
3,813,231 A    5/1974  Gilbert et al.
(Continued)

FOREIGN PATENT DOCUMENTS

CN       1102370 A    5/1995
CN       1420810 A    5/2003
(Continued)

*Primary Examiner* — Pegah Parvini
(74) *Attorney, Agent, or Firm* — Perkins Coie LLP; Michael A. Glenn

(57) ABSTRACT

The invention relates to a coated abrasive tool including a carrier which has a carrier material and including an abrasive surface coating on a surface region of the carrier. The abrasive surface coating has abrasive functional particles and a thermoplastic binder for an adhesive connection between at least some of the abrasive functional particles and the carrier material. At least some of the abrasive functional particles on the surface region of the carrier are partly integrated into the carrier material and are connected to the carrier material, and at least some of the abrasive functional particles on the surface region of the carrier are additionally partly integrated into the thermoplastic binder, the thermoplastic binder being connected to the abrasive functional particles and the carrier material.

12 Claims, 7 Drawing Sheets

(51) Int. Cl.
*A61C 3/025* (2006.01)
*A61C 3/06* (2006.01)
*B24D 3/00* (2006.01)
*B24D 3/20* (2006.01)
*C23C 4/04* (2006.01)
*C23C 4/134* (2016.01)
*B82Y 40/00* (2011.01)

(52) U.S. Cl.
CPC ............... *A61C 3/06* (2013.01); *B24D 3/007* (2013.01); *B24D 3/20* (2013.01); *C23C 4/134* (2016.01); *A46B 2200/3093* (2013.01); *B82Y 40/00* (2013.01)

(58) Field of Classification Search
CPC ...... A46B 2200/108; A46B 2200/3093; A61C 3/025; A61C 3/00; A61C 3/005
See application file for complete search history.

(56) References Cited

U.S. PATENT DOCUMENTS

| | | | |
|---|---|---|---|
| 4,240,807 A | 12/1980 | Kronzer | |
| 4,343,910 A | 8/1982 | Busch et al. | |
| 4,925,457 A | 5/1990 | Dekok et al. | |
| 5,078,754 A | 1/1992 | Jefferies et al. | |
| 5,273,558 A | 12/1993 | Nelson et al. | |
| 5,595,578 A | 1/1997 | Stubbs et al. | |
| 5,681,361 A | 10/1997 | Sanders | |
| 5,704,952 A * | 1/1998 | Law | B24D 3/346 |
| | | | 51/306 |
| 5,833,724 A | 11/1998 | Wei et al. | |
| 5,984,632 A | 11/1999 | Lee et al. | |
| 6,024,824 A | 2/2000 | Krech | |
| 6,254,468 B1 | 7/2001 | Gozzi et al. | |
| 2009/0042166 A1 | 2/2009 | Craig et al. | |
| 2009/0130627 A1 | 5/2009 | Herman | |
| 2009/0191798 A1* | 7/2009 | Koh | B29C 45/0013 |
| | | | 15/171 |
| 2013/0078450 A1 | 3/2013 | Jensen et al. | |
| 2015/0367477 A1* | 12/2015 | Hayashi | B24D 13/145 |
| | | | 451/103 |

FOREIGN PATENT DOCUMENTS

| | | |
|---|---|---|
| CN | 202069145 U | 12/2011 |
| CN | 102481647 A | 5/2012 |
| CN | 106263496 A | 1/2017 |
| DE | 2657881 A1 | 6/1978 |
| DE | 69212319 T2 | 8/1996 |
| DE | 69607037 T2 | 4/2000 |
| DE | 69713628 T2 | 8/2002 |
| DE | 102010022593 A1 | 12/2011 |
| DE | 102011014992 A1 | 9/2012 |
| EP | 0514586 A2 | 11/1992 |
| EP | 2377487 A1 | 10/2011 |
| EP | 3211974 A1 | 8/2017 |
| FR | 1102074 A | 10/1955 |
| GB | 2038214 A | 7/1980 |
| JP | H11197164 A | 7/1999 |
| KR | 20170055010 A | 5/2017 |
| WO | 9858771 A1 | 12/1998 |
| WO | 0143918 A2 | 6/2001 |
| WO | 2011020105 A2 | 2/2011 |
| WO | 2017147510 A1 | 8/2017 |

* cited by examiner

300

```
┌─────────────────────────────────────────────────────┐
│  5    Supplying a powder mixture to a thermal or    │
│       low-thermal plasma spraying device directed   │
│       onto a surface area of a substrate to be      │
│       coated,                                        │
│                                                      │
│       wherein the powder mixture comprises abrasive │
│       functional particles and a thermoplastic     │
│       binder,                                        │
│  10                                                  │
│       wherein the powder mixture comprises          │
│       the functional particles and the thermoplastic│
│       binder as separate powder particles, or       │         310
│                                                      │
│       wherein the powder mixture comprises          │
│       the functional particles at least partially   │
│  15   or completely clad with the thermoplastic     │
│       binder, and                                    │
│                                                      │
│       wherein a reduction of the viscosity          │
│       of the binder is effected in the thermal or   │
│       low thermal plasma spraying device, and       │
│  20                                                  │
└─────────────────────────────────────────────────────┘
                          │
                          ▼
┌─────────────────────────────────────────────────────┐
│       Depositing the functional particles with the  │
│       binder comprising reduced viscosity to a      │
│       surface area of the carrier, wherein the      │
│       thermoplastic binder re-solidifies during     │
│       deposition to the surface area of the carrier │         320
│  25   and the abrasive surface coating is formed on │
│       the carrier of the abrasive tool with the     │
│       functional particles and the thermoplastic    │
│       binder.                                        │
└─────────────────────────────────────────────────────┘
```

Fig. 4

COATED ABRASIVE TOOL, METHOD FOR PRODUCING THE SAME AND ABRASIVE DENTAL PRODUCT

CROSS-REFERENCE TO RELATED APPLICATIONS

This application is a continuation of copending International Application No. PCT/EP2020/060901, filed Apr. 17, 2020, which is incorporated herein by reference in its entirety, and additionally claims priority from German Application No. 102019205745.4, filed Apr. 18, 2019, which is also incorporated herein by reference in its entirety.

Embodiments of the present invention relate to a coated abrasive tool, to a method for producing the same, and further to an abrasive dental product. In particular, embodiments of the present invention relate to a coated abrasive tool in the form of a grinding tool, a polishing tool and/or a cleaning tool, and to the production of the same, as well as to the application of the same in the dental field as a dental cleaning and/or grinding product.

BACKGROUND OF THE INVENTION

Generally, hard material grains used for grinding, i.e. for material removal by cutting with bonded grain, are referred to as grinding means or abrasives. A distinction can be made between natural grain materials and synthetic grain materials. Grinding means applied to carrier materials are also referred to as grinding means on a support, in which case the grinding means is seated on the surface of the carrier material. Further, grinding means can also be formed into grinding bodies. Grinding bodies include, e.g., cutting wheels, grinding wheels and diamond grinding wheels, etc.

In the case of the illustrated grinding means on a support or grinding bodies, removal of the grinding means coating occurs from the top (=the current surface of the grinding element) downwards during use of the same, so that there is continuous wear of the grinding element and thus a reduction in the grinding and/or cleaning effect of the element. Further, the removal of the grinding element and thus the wear of the grinding means of the grinding element is directly dependent on the pressure of the grinding element on the workpiece to be machined.

SUMMARY

According to an embodiment, a coated abrasive tool may have: a carrier including a carrier material, and an abrasive surface coating on a surface area of the carrier, wherein the abrasive surface coating includes abrasive functional particles and a thermoplastic binder for an adhesive bond between at least part of the abrasive functional particles and the carrier material, wherein at least part of the abrasive functional particles on the surface area of the carrier is partially embedded in and bonded to the carrier material, and wherein at least part of the abrasive functional particles on the surface area of the carrier is further partially embedded in the thermoplastic binder, wherein the thermoplastic binder is bonded to the abrasive functional particles and the carrier material.

According to another embodiment, a method for producing a coated abrasive tool, may have the steps of: supplying a powder mixture to a thermal or low-thermal plasma spraying apparatus directed onto a surface area of a carrier to be coated, wherein the powder mixture includes abrasive functional particles and a thermoplastic binder, wherein the powder mixture includes the functional particles and the thermoplastic binder material as separate powder particles, or wherein the powder mixture includes the functional particles at least partially or completely clad with the thermoplastic binder, and wherein a reduction in the viscosity of the binder is effected in the thermal or low-thermal plasma spraying apparatus, and depositing the functional particles with the reduced viscosity binder on a surface area of the carrier, wherein the thermoplastic binder re-solidifies upon deposition on the surface area of the carrier and the abrasive surface coating is formed on the carrier of the abrasive tool with the functional particles and the thermoplastic binder.

According to another embodiment, an abrasive dental product may have the inventive coated abrasive tool.

According to another embodiment, a coated abrasive tool may have: a carrier including a backing material, and an abrasive surface coating on a surface area of the carrier, wherein the abrasive surface coating includes grinding grains and a thermoplastic binder for an adhesive bond between at least part of the grinding grains and the carrier material, wherein at least part of the grinding grains is partially embedded in the carrier material on the surface area of the carrier and is connected to the carrier material in a form-fitting manner, wherein at least part of the grinding grains on the surface area of the carrier is further partially embedded in the thermoplastic binder, wherein the thermoplastic binder is connected to the grinding grains and the carrier material in an integrated and/or form-fitting manner, wherein the grinding grains have an average diameter d1, wherein at least part of the grinding grains of the abrasive surface coating is embedded in an embedding depth d2 of the carrier material, wherein the embedding depth d2 corresponds to at least 5% and at most 95% of the average diameter d1 of the grinding grains, wherein at least 60% of the area of the abrasive surface coating is covered with a monolayer of the grinding grains on the surface area of the carrier, and wherein the average thickness d4 of the deposited thermoplastic binder is smaller than the average diameter d1 of the grinding grains and the grinding grains protrude from the thermoplastic binder.

According to an embodiment, a coated abrasive tool comprises a carrier comprising a carrier material, and an abrasive surface coating on a surface area of the carrier, wherein the abrasive surface coating comprises abrasive functional particles and a thermoplastic binder for an adhesive bond between at least part of the abrasive functional particles and the carrier material, wherein at least part of the abrasive functional particles on the surface area of the carrier is partially embedded in the carrier material and bonded to the carrier material, and wherein at least part of the abrasive functional particles on the surface area of the carrier is further embedded or partially embedded in the thermoplastic binder, wherein the thermoplastic binder is bonded to the abrasive functional particles and the carrier material.

According to an embodiment, a method for producing a coated abrasive tool comprises the steps of: supplying a powder mixture to a thermal or low-thermal plasma spraying apparatus directed onto a surface area of a substrate to be coated, wherein the powder mixture comprises abrasive functional particles and a thermoplastic binder, wherein the powder mixture comprises the functional particles and the thermoplastic binder as separate powder particles, or wherein the powder mixture comprises the functional particles at least partially or completely clad with the thermoplastic binder, and wherein a reduction in the viscosity of the binder is effected in the thermal or low-thermal plasma spraying apparatus, and depositing the functional particles with the reduced viscosity binder on a surface area of the carrier, wherein the thermoplastic binder re-solidifies upon deposition on the surface area of the carrier and the abrasive surface coating is formed on the carrier of the abrasive tool with the functional particles and the thermoplastic binder.

The core idea of the present invention is to provide a low-wear coated abrasive tool, such as a grinding tool, a polishing tool, a cleaning body or a coated brush, wherein the abrasive functional particles, i.e. the grinding means or abrasives, are bonded to the carrier material or substrate in an adhesive manner. For this purpose, on the one hand, the abrasive functional particles are partially or at least partially embedded in the carrier material or anchored therein, wherein further a thermoplastic binder or polymer is applied to the surface area of the carrier and the abrasive functional particles, so that the abrasive functional particles are further embedded or partially embedded in the thermoplastic binder on the surface area, i.e. the thermoplastic binder is bonded to the abrasive functional particles and the carrier material in an integrated and/or form-fitting manner. Thus, reliable adhesive fixing of the abrasive functional particles to the carrier can be achieved in order to obtain the wear-resistant abrasive surface coating of the abrasive tool. Thus, the thermoplastic binder (also serves as protection or wear protection for the embedded abrasive functional particles or grinding particles. As a result, an increased service life of the coated abrasive tool can be achieved due to the reduced wear of the abrasive surface coating.

The thermoplastic binder can further cause reduced adhesion of the abraded material to the coated abrasive tool, so that the abraded material or grinding dust can be relatively easily removed or sucked off from the abrasive surface coating, for example by means of air flow. This reduces clogging of the tool, which leads to a longer service life.

Further, based on the material properties of the thermoplastic binder, both the ablation behavior of the abrasive surface coating and the gliding properties of the abrasive surface coating can be adjusted to the workpiece to be machined or adapted to the material properties of the workpiece to be machined.

Here, the abrasive surface coating can be configured as a surface coating (=side surface coating) and/or an edge coating (=front surface coating) of the abrasive tool.

The abrasive surface coating can be used for abrasive dental products, such as a dental cleaning product or a dental grinding product, since the material removal can be adjusted in an extremely precise manner via the materials used for the carrier, the thermoplastic binder and the abrasive functional particles (grains). Thus, abrasive dental products can be produced and provided which, on the one hand, merely perform surface cleaning of the workpiece to be machined, such as cleaning teeth by means of a suitably configured toothbrush, and, on the other hand, have a smoothing or grinding effect on the workpiece to be machined, such as on a dental ceramic crown, with a suitably configured grinding head or grinding drill.

Further, the coated abrasive tool can be produced, for example, in an extremely efficient manner using the described production method.

BRIEF DESCRIPTION OF THE DRAWINGS

Embodiments of the present invention will be detailed subsequently referring to the appended drawings, in which:

FIG. 4 shows a schematic flow diagram of a method for producing a coated abrasive tool according to a further embodiment;

DETAILED DESCRIPTION OF THE INVENTION

Before embodiments of the present concept are explained in detail below with reference to the drawings, it is pointed out that identical, functionally identical or equal elements, objects, functional blocks and/or method steps are provided with the same reference signs in the different figures, so that the description of these elements, objects, functional blocks and/or method steps shown in different embodiments is interchangeable or interapplicable.

Different embodiments will now be described in more detail with reference to the accompanying drawings, in which some embodiments are illustrated. In the figures, dimensions of illustrated elements, layers and/or areas may not be shown to scale for clarity reasons.

To simplify the description of the different embodiments, the figures comprise a Cartesian coordinate system x, y, z, where the x-y plane corresponds to or is parallel to the main surface area of the carrier or substrate, and wherein the vertical direction is perpendicular to the x-y plane and corresponds to the depth direction through the abrasive surface coating. In the following description, the term "lateral" indicates a direction in the x-y plane (or parallel thereto), wherein the term "vertical" indicates a direction in the ±z direction (or parallel thereto).

Figure 1A:
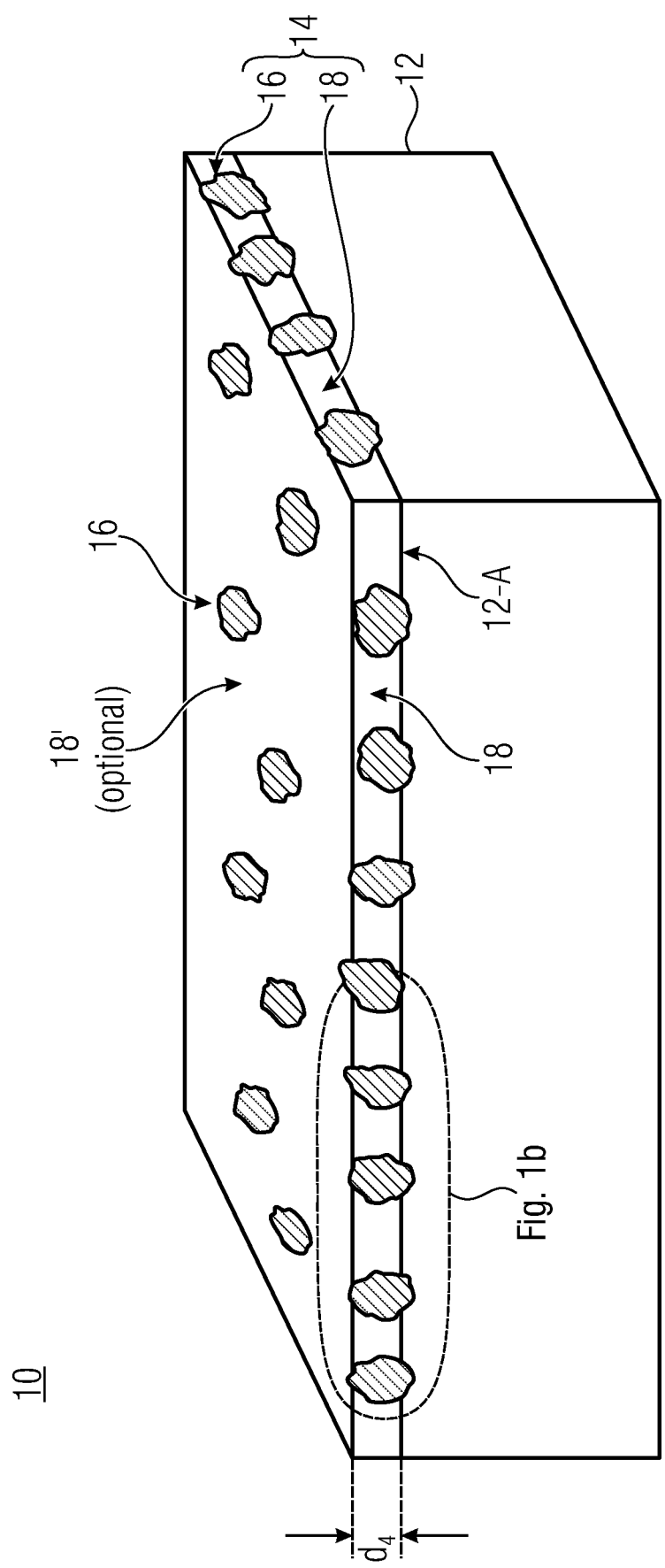
FIG. 1a shows a schematic representation in a perspective top view (=3D view) of a surface area of an abrasive tool, e.g. coated over its entire surface, according to an embodiment.
Figure 1B:
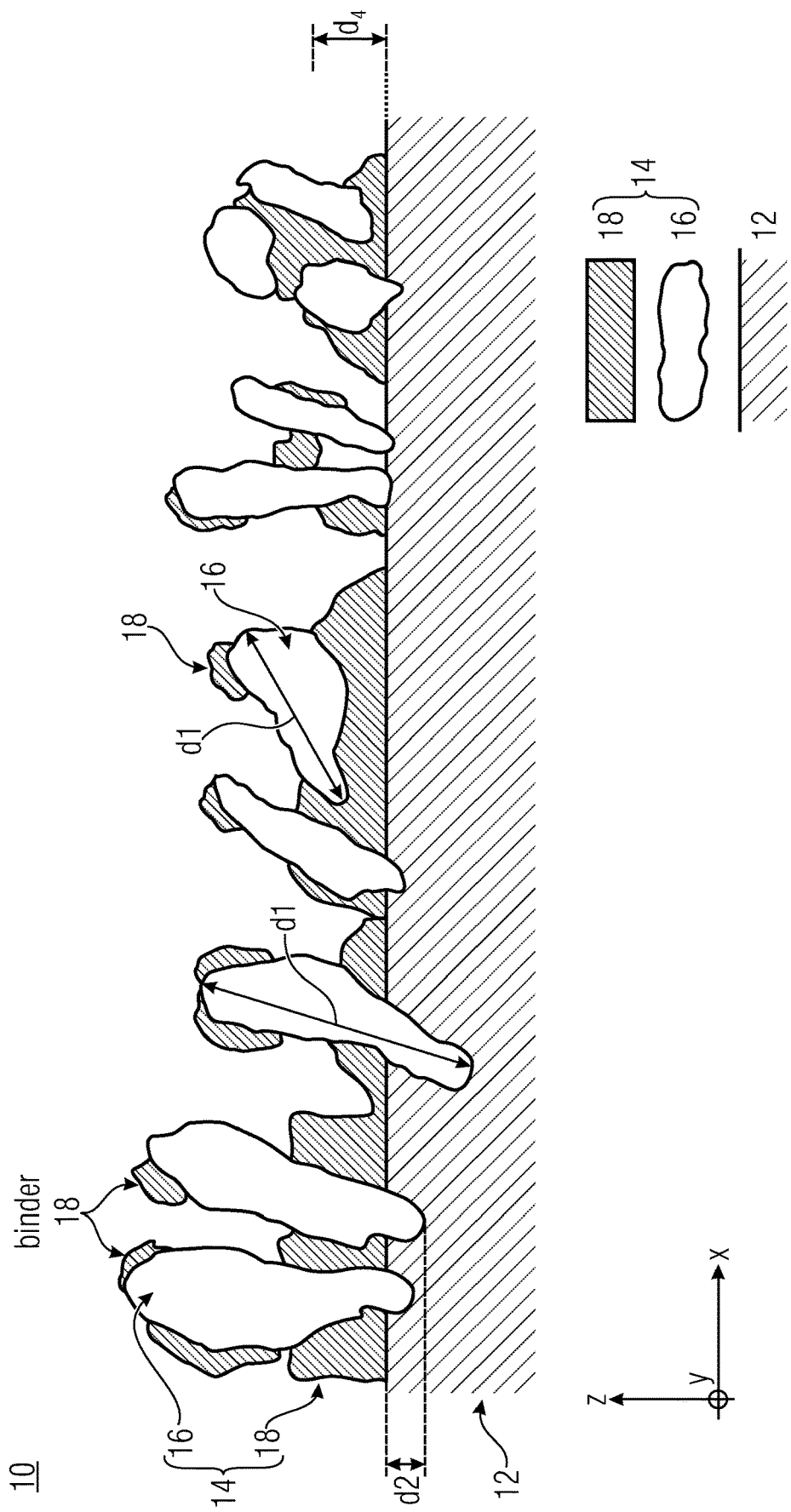
FIG. 1b shows a schematic cross-sectional view of a surface area of a coated abrasive tool according to an embodiment.

Referring now to FIG. 1a-b, a coated abrasive tool 10 according to an embodiment will be described. Here, FIG. 1a illustrates a perspective view of a surface area 10-A of the coated abrasive tool 10, while FIG. 1b illustrates an enlarged partial section of the surface area 10-A of the coated abrasive tool 10 in a cross-sectional view.

As illustrated in FIG. 1a-b, the coated abrasive tool 10 comprises a carrier or base body 12 and an abrasive surface coating 14 on a surface area 12-A of the carrier 12. Depending on the field of application of the abrasive tool 10, the carrier 12 can comprise, for example, a rigid carrier material or a flexible or elastic carrier material. The surface coating 14 is thus arranged, for example, on the surface area 12-A of the carrier 12 which is to be effective as an abrasive machining surface of the coated abrasive tool 10.

The abrasive surface coating 14 comprises abrasive functional particles 16 and a thermoplastic binder 18, e.g. a thermoplastic polymeric material, for an adhesive bond between at least part of the abrasive functional particles 16 and the carrier 12. At least part, e.g. at least 60%, 80%, 90% or 99%, of the abrasive functional particles 16 is at least partially (partially or also completely) embedded in or anchored in the carrier material on the surface area 12-A of the carrier 12, and thus adhesively bonded to the carrier material. Thus, the partial embedding of the abrasive functional particles 16 in the carrier 12 thus forms, for example, a form-fitting bond. The embedded abrasive functional particles 16 are also referred to as bonded grains 16. According to an embodiment, the abrasive functional particles 16 are thus only partially embedded in the carrier 12 and thus form the form-fitting bond, for example.

As shown exemplarily in the schematic illustration in FIG. 1a of the abrasive surface area 14, the abrasive surface coating according to an embodiment can be distributed or also formed "over the entire surface", i.e. the gaps between the abrasive functional particles 16 on the carrier 12 can, for example, be partially or completely filled with the thermoplastic binder 18 and optionally one or several further deposited materials 18' (for example additive materials 18' improving the gliding properties). Thus, a coating can be arranged as an abrasive surface coating 14 on the carrier 12, which is formed over the entire surface or also distributed (spaced apart) on the surface area 12-A depending on the (adjusted) occupancy or distribution density of the abrasive functional particles 16, the thermoplastic binder 18 and the additive materials 18'. The additive materials 18' can also be incorporated or integrated into the thermoplastic binder 18. The abrasive surface coating 14 with the combination of the abrasive functional particles 16, the thermoplastic binder 18 and the optional additive materials 18' can also be formed as a continuous or planar layer or also as a distributed monolayer. The abrasive functional particles (16) also protrude, for example, from the optional additive material 18'.

According to a further embodiment, as illustrated for example based on FIG. 1b, the abrasive surface coating 14 can also be applied to the carrier 12 in a "non-surface covering" (not fully covering) manner, such that in a top view of the surface area 12-A of the carrier 12, parts of surface areas of the carrier material are exposed. Thus, the surface coverage by the abrasive surface coating 14 on the carrier 12 can be, for example, in a range from 1% (5% or 10%) to 100%.

The abrasive functional particles 16 can thus be partially or also completely covered or enclosed by the thermoplastic binder 18, wherein, via the applied amount of the thermoplastic binder 18 and thus via the partial or complete covering of the functional particles 16, the wear properties, removal properties, gliding properties and/or adhesion properties for the removed material can be adjusted or matched to the material of the workpiece to be machined, which nevertheless leads to bonding in the gaps of the functional particles 16.

At least part, e.g. at least 60%, 80%, 90% or 99%, of the abrasive functional particles 16 is embedded in the thermoplastic binder 18 on the surface area 12-A of the substrate 12, wherein the thermoplastic binder 18 is bonded to the abrasive functional particles 16 and the substrate in a form-fitting and/or integrated manner. Thus, the abrasive surface coating 14 with the combination of the abrasive functional particles 16 and the thermoplastic binder 18 can also be configured here as a non-surface covering (not completely covering or closed) monolayer.

In the context of the present description, a material for the abrasive functional particles is referred to as abrasive as long as the same has an abrasive or grinding effect on a workpiece to be machined (not shown in FIG. 1a-b), which in turn results in a smoothing, cleaning or wearing effect on the workpiece to be machined.

The abrasive effect of the coated abrasive tool can further be adjusted via the embedding depth of the abrasive functional particles 16 in the carrier material, via the carrier material and/or via the material of the thermoplastic binder 18. Here, the elasticity of the carrier material and the elasticity of the thermoplastic binder 18 can be adjusted and/or matched to each other. In the context of the present description, a material is described as elastic if the material or the material changes its shape when a force is applied and can return to its original shape when the applied force is removed within the linear-elastic behavior.

For example, the material properties of the thermoplastic binder 18 and other optionally deposited additional materials, such as PTFE (polytetrafluoroethylene), graphite, ceramics, and molybdenum sulfide (MoS2) as a dry lubricant, can be used to adjust the resulting gliding properties of the coated abrasive tool 10 over the surface of the workpiece (not shown in FIG. 1a-b) to be machined.

In the context of the present description, thermoplastic materials (thermoplastics or plastomers) are plastic materials which can be "thermoplastically" deformed within a certain temperature range. This process is reversible, i.e. it can be hardened again by cooling. As long as there is no overheating of the thermoplastic material (=a so-called "thermal decomposition"), the properties of the thermoplastic material remain unchanged or are preserved before and after heating, i.e. before and after deposition on the coated abrasive tool 10, since the molecular chains of the thermoplastic material are not destroyed or broken up. This is an essential property of the thermoplastic binder 18, in particular for the production process illustrated with reference to FIGS. 3 and 4.

In one embodiment, an additional material 18' can further be deposited as a surface covering material on the existing abrasive surface coating 14 to adjust the resulting gliding properties of the coated abrasive tool 10. In the production method 300 illustrated below, the additional material 18' can be deposited simultaneously with the thermoplastic binder 18 or subsequently to the thermoplastic binder 18 on the surface area 12-A of the substrate 12 provided with the abrasive functional particles 16. Thus, the additional material or materials can also be integrated or introduced into the thermoplastic binder 18 for adjusting the properties of the abrasive surface coating 14. For example, using dry lubricants such as, for example, PTFE, graphite, ceramics, and molybdenum sulfide (MoS2), reduced friction can be obtained between the abrasive tool 10 and the workpiece being machined.

The carrier material of the carrier 12 may, for example, be a combination of different materials, e.g. a carrier 12 with a PUR carrier layer and an SBR cover layer, wherein the abrasive functional particles 16, e.g. diamond, are arranged on the carrier 12 with the thermoplastic binder 18, e.g. POM, and the optional additional material 18', e.g. a lubricant (PTFE).

According to an embodiment, the abrasive functional particles 18 have an average diameter d1, for example between 100 nm and 2 mm. At least part, e.g. at least 80%, 90% or 99%, of the abrasive functional particles 18 of the abrasive surface coating 14 is embedded in the carrier material at an average (mean) embedding depth d2, wherein the embedding depth d2 corresponds to at least 5% (or 10%) and, e.g., at most 95% (99%) of the average diameter d1 of the abrasive functional particles 16. The abrasive functional particles 16 are thus at least partially or also completely embedded or anchored in the carrier material on the surface area 12-A of the carrier 12 and are thus adhesively bonded to the carrier 12, i.e. bonded in a form-fitting manner, for example.

In order to already obtain a sufficient cleaning, grinding and/or removing effect of the abrasive surface coating 14, it is sufficient that only a small part, e.g. about 1 to 5% of the average diameter d1 of the abrasive functional particles is exposed and protrudes from the carrier material and/or the thermoplastic binder.

Thus, during an exposure, grinding or ablation operation, the highest pressure force is applied to the surface of the workpiece to be machined via the abrasive functional particles 16 protruding at least slightly from the abrasive surface coating 14, the abrasive functional particles 16 being (relatively) elastically fixed in the elastic material of the thermoplastic binder 18 and/or of the carrier 12, and the abrasive tool 10 being able to follow the contour of the workpiece to be machined. Thus, extremely effective surface machining of the surface of the workpiece can be achieved with extremely low wear of the abrasive tool 10.

The arrangement of the abrasive functional particles as a monolayer in the abrasive surface coating 14 ensures that a very large number of abrasive functional particles 16 grip simultaneously during a machining operation, i.e. act on the workpiece to be machined, so that the cleaning, grinding and/or removing operation can be carried out in an extremely effective manner.

The combination of embedding the abrasive functional particles in the carrier material as well as embedding the abrasive functional particles in the thermoplastic binder results in an extremely adhesive bond or anchoring of the abrasive functional particles 16 to the carrier 12.

Depending on the materials used for the carrier material, the abrasive functional particles 16 and the thermoplastic binder 18, there is an integrated and/or form-fitting bond of these components for adhesive connection or anchoring of the abrasive functional particles 16 to the carrier 12. In the case of "inert" abrasive functional particles 16, the partial embedding of the abrasive functional particles 16 in the carrier material essentially results in a form-fitting bond between the abrasive functional particles 16 and the carrier material of the carrier 12, and there is further correspondingly a form-fitting bond of the "inert" abrasive functional particles 16 to the thermoplastic binder 18. Further, depending on the materials, an integrated bond (for example adhesive bond) of the thermoplastic binder 18 with the carrier material of the carrier 12 and/or a form-fitting bond (=interlocking) of the applied thermoplastic binder 18 with the carrier material of the carrier 12, for example an open-pored carrier material, can take place.

According to an embodiment, it is further possible for abrasive functional particles 18 made of a non-inert material to also be bonded in a form-fitting manner to the thermoplastic binder 18 and/or the carrier material of the carrier 12.

According to an embodiment, at least 60%, 80% or 90% of the area of the abrasive surface coating 14 is covered with a monolayer of the abrasive functional particles 16 on the surface area 12-A of the carrier 12, i.e. in a single layer or in a plane. The deposited and embedded abrasive functional particles 16 form, together with the thermoplastic binder 18, form an abrasive surface coating 14 in which the abrasive functional particles 16 are arranged in a single layer or two-dimensionally (x-y plane).

According to an embodiment, the deposited thermoplastic binder 18 has an average thickness d4, wherein the average thickness d4 of the deposited thermoplastic binder 18 is smaller than the average diameter d1 of the abrasive functional particles 16, such that the abrasive functional particles 16 partially protrude from the thermoplastic binder 18.

As shown in FIG. 1b, the majority of the abrasive functional particles 16 are arranged side-by-side on the surface area 12-A of the carrier. However, a few of the deposited abrasive functional particles 16 can also be arranged "on top of each other" or "clumped" on the surface area 12-A of the carrier (see FIG. 1b—far right), although this can be largely avoided by the production process 300 described below. Since the abrasive functional particles 16 are configured, for example, as a monolayer (single layer on the carrier material) in combination with the thermoplastic binder 18 as the abrasive surface coating 14, an extremely dimensionally stable abrasive tool 10 can be realized which, above that, has extremely good gliding properties on the workpiece to be machined, i.e. the abrasive tool 10 can be guided over the surface of the workpiece to be machined with relatively little force.

According to an embodiment, the abrasive functional particles 16 on the surface area 12-A of the carrier 12 can have an occupancy density A (=distribution of the abrasive functional particles 16 on the surface area 12-A) with A=0.1-100%, or A=0.1-10%, or A=1-5%, i.e. the abrasive functional particles 16 are arranged on the surface of the treated surface area of the component either in a distributed manner or also on the entire area. The thermoplastic binder 18 can then occupy the resulting gaps of the surface area 12-A of the carrier 12 with an occupancy density B with B=100%−A, B≥90%−A, or B≥80%−A, i.e. completely (B=100%) or partially (B≥90% or B≥80%).

Thus, by selecting the occupancy or distribution density A of the abrasive functional particles 16 on the surface area 12-A of the carrier 12, the removal effect can now further be selectively adjusted. For example, an increased occupancy density A of the abrasive functional particles 16 can contribute to an increased removal effect of the abrasive tool 10.

According to an embodiment, the surface area 12-A of the carrier 12 can be (relatively) smooth or flat (as shown exemplarily in FIG. 1a-b).

According to a further embodiment, the surface area 12-A of the carrier 12 can be profiled and can have, for example, knobs, a pyramid shape, a truncated pyramid shape, a cone shape, a truncated cone shape, or a wave shape in cross-section. The choice of profiling or topology of the surface area 12-A of the carrier 12 can further be used to selectively adjust the removal effect.

According to a further embodiment, the surface area 12-A of the carrier 12 provided with the abrasive surface coating 14 can also have a groove structure or a structure with spirally arranged depressions or elevations (=worm structure) of the surface area.

Since the abrasive functional particles 16 are configured as a monolayer in combination with the thermoplastic binder 18, the abrasive surface coating 14 can follow the surface contour of such a profiled carrier 12 in an extremely precise manner, i.e., even a relatively fine, detailed contour of the carrier 12 is maintained after deposition of the abrasive surface coating 14 to the surface area 12-A. Thus, for example, so-called "grinding pads" can be provided by the coated abrasive tool 10, which can be adjusted to specific grinding angles, such as for grinding the flanks of gears, etc., due to the topography of the carrier 12. Due to the elastic carrier material, such grinding pads 10 can also follow the 3D surface of the workpiece (object to be ground) to be machined, so that minor irregularities on the workpiece to be machined do not have any or substantially no negative effect with respect to the resulting grinding effect. In particular when used as a dental cleaning product (toothbrush), this is an advantageous property for achieving substantially complete cleaning of the workpiece to be machined, e.g. the teeth when brushing.

Profiling the surface area 12-A of the carrier 12 can also assist in easily transporting contaminants, i.e., for example, removed material or grinding dust from the machined workpiece, to the outside, so that the resulting grinding dust can be more easily removed or sucked off without clogging the grinding tool 10 with the same, so that long service lives of the grinding tool 10 can be achieved.

This surface profiling on the surface area 12-A of the carrier 12 can be carried out, for example, during the method 300 described below for producing a coated abrasive tool 10, by using the thermal or low-temperature spraying apparatus (plasma spraying apparatus) used therein to introduce and obtain the desired profiling of the surface area of the carrier 12 by acting thermally on the carrier material.

According to embodiments, the geometrical configuration of the surface area 12-A of the carrier 12 can assume substantially any free-form surface, for example formed as a counterpart or negative shape with respect to the workpiece to be machined, the machining operation being a grinding operation, cleaning operation, polishing operation, etc.

Now, for example, if the workpiece is spherical or configured in a spherical segment shape, the carrier 12 can have a surface area 12-A formed as a negative shape or counterpart to the spherical or spherical segment-shaped workpiece. Further possible geometric configurations of the surface area 12-A of the carrier 12 can be, for example, a cylindrical shape, a cone shape, a truncated cone shape, etc., or threaded structure to form the negative shape for a corresponding workpiece (=3D body) in the form of, for example, a sphere, a recess, a bore, a feedthrough, a thread, etc. However, these enumerations of 3D bodies are not to be regarded as exhaustive.

By forming the surface area 12-A of the carrier 12 as a negative shape of the surface area 12-A of the workpiece 12 to be machined, planar machining or planar load of the abrasive tool 10 can be applied to the surface area of the workpiece to be machined. Thus, an extremely uniform grinding, polishing and/or cleaning effect can be obtained for any 3D bodies (=workpieces to be machined). Due to the uniform and planar machining of the workpiece, an extremely uniform grinding, polishing and/or cleaning pattern can be obtained by the abrasive tool 10 on the workpiece to be machined.

According to an embodiment, the coated abrasive tool 10 can comprise a carrier material comprising, e.g., cork, textile, rubber, elastomer, PVC (polyvinyl chloride), PUR (polyurethane), paper, latex, PE (polyethylene), PA (polyamide), PET (polyethylene terephthalate), PC (polycarbonate), SBR (styrene-butadiene rubber), PTHF (polytetrahydrofuran), carbonate, with a foam material, a bristle material of a brush and/or a foil material. The carrier material can be, for example, flexible or elastic.

According to an embodiment, the abrasive functional particles 16 can be configured as hard particles or grains and can comprise, e.g., corundum, zirconia alumina, silicon carbide, boron nitride, glass, minerals, e.g. apatite, natural materials, e.g. crushed or ground shells, nutshells, etc., or diamond having a particle size between 100 nm and 2 mm.

According to an embodiment, the abrasive functional particles 16 can comprise an inert material, for example a stable material that is unreactive under given conditions. Via the concentration and/or hardness of the abrasive functional particles 16 in the abrasive surface coating 14, The resulting removal rate of the abrasive tool 10 (at a defined contact pressure) can now be adjusted via the concentration and/or hardness of the abrasive functional particles 16 in the abrasive surface coating 14.

According to an embodiment, the coated abrasive tool 10 can comprise a thermoplastic binder 18 with a thermoplastic polymer material, such as PE (polyethylene), PA (polyamide), PC (polycarbonate), ABS (acrylonitrile butadiene styrene), PVC (polyvinyl chloride), PET (polyethylene terephthalate), PEEK (polyether ether ketone), PTFE (polytetrafluoroethylene), PUR (polyurethanes), PMMA (polymethyl methacrylate), or PTHF (polytetrahydrofuran). The carrier material can also be flexible or elastic, e.g., in which case the abrasive functional particles, i.e. the grinding means or the abrasive materials, are reliably bonded thereto in an adhesive manner, e.g. in a form-fitting manner.

According to an embodiment of the coated abrasive tool 10, the thermoplastic binder 18 and the carrier material 12 can comprise the same material or the same material composition.

By this bonding or anchoring of the abrasive functional particles 16 to the carrier 12, which comprises, e.g., an elastic carrier material, a certain freedom of movement of the abrasive functional particle (=grinding grain) 18 can be achieved during a grinding operation, so that when (increased) pressure is applied to the coated abrasive tool 10, i.e. when the coated abrasive tool is pressed against a workpiece to be machined, the embedded abrasive functional particles (=bonded grinding grains) 16 do not break away, break out of the bond or break, as is the case with grinding elements common in conventional technology, but perform an evasive movement, e.g. a dipping, into the carrier material and/or an elastic, lateral tilting away, due to the flexibility or elasticity of the carrier material. This possible vertical and/or lateral evasive movement of the embedded abrasive functional particles 16 can thus result in a kind of 3D mobility of the embedded abrasive functional particles 16. Thus, the wear of the embedded abrasive functional particles can be significantly reduced, whereby an extremely dimensionally stable coated abrasive tool can be provided.

In particular, the choice of the material of the thermoplastic binder, i.e., for example, the respective hardness of the thermoplastic binder, in coordination with the abrasive functional particles and the, e.g., elastic carrier material, can now be used to specifically adjust the removal effect, the gliding properties with respect to the workpiece to be machined and further the mechanical stability of the abrasive tool. For example, an increased hardness of the thermoplastic binder, i.e. a hard or rigid thermoplastic binder, can contribute to an increased removal effect, improved gliding properties and an increased stability of the abrasive tool.

In summary, it can be stated that an extremely reliable adhesive bond can be obtained between the abrasive functional particles 16, which act as cutting materials, and the carrier material of the carrier 12 by the inventive attachment of the abrasive functional particles 16 to the carrier material, i.e. on the one hand by embedding or anchoring the abrasive functional particles 16 in the carrier material and on the other hand by embedding the abrasive functional particles 16 in the thermoplastic binder 18 and the resulting integrated or form-fitting bond (=adhesive bond) of the abrasive functional particles 16 to the carrier material.

Due to the above-described "3D mobility" of the embedded abrasive functional particles 16 on the carrier 12 and the resulting adhesive bond between the abrasive functional particles 16 and the carrier 12, relatively large abrasive functional particles 16 can be used on the workpiece to be machined with an unchanged surface machining result. Thus, with the present concept, abrasive functional particles 16 having an average particle size at least twice or even three times larger compared to conventional grinding means can be used. For example, with conventional grinding means with a grain size of P3000, abrasive functional particles having an average diameter of 7 μm are used, whereas with the present inventive abrasive tool 10, with a grain size of P3000, abrasive functional particles 16 with an average particle size (d50) of 15-25 μm, 18-22 μm and about 20 μm can be used on the flexible carrier 12 due to the 3D mobility of the abrasive functional particles.

Due to the possible use of relatively large abrasive functional particles 16, a higher material removal rate and thus a faster processing speed can be achieved by the present abrasive tool 10 compared to conventional grinding means while achieving substantially the same surface result. Further, the use of larger abrasive functional particles 16 leads to an increased service life of the abrasive tool 10, since larger functional particles 16 have a larger area for bonding and thus for adhesive bonding with the carrier material of the carrier.

The 3D mobility of the abrasive functional particles 16 on the carrier 12 leads in particular to a homogeneous, planar machining effect, i.e. to a very homogeneous grinding, polishing and/or cleaning pattern on the workpiece to be machined. Thus, in particular, scratches occurring with conventional grinding means can be eliminated by a so-called "rolling grain", since the abrasive functional particles 16 can "dip" into the, for example, flexible or open-pored carrier material of the carrier 12 when a high or increased force is applied. The inventive abrasive tool 10 can thus effectively prevent, even in the case of an unevenly distributed contact force, any optical change in the machining image on the workpiece to be machined, this being advantageous in particular for machining in "manual operation". Thus, a homogeneous, recurring machining pattern, i.e. grinding, polishing and/or cleaning pattern can be realized, in particular also in manual operation. Even tilting of the abrasive tool 10 on the workpiece to be machined by the operator or an operating device can be compensated for or the effects at least greatly reduced by the 3D mobility of the abrasive functional particles 16 on the carrier 12.

Via the size and/or concentration of the abrasive functional particles 16 in the abrasive surface area and/or via the hardness of the thermoplastic binder 18, the resulting removal rate of the abrasive tool 10 (at a defined contact pressure) can now also be adjusted. Further, a relatively low wear of the abrasive tool 10, i.e. a relatively low removal of the abrasive functional particles (cutting materials) 16 can be realized in the application, so that, compared to grinding elements known in conventional technology, considerably longer service lives can be obtained by the inventive coated abrasive tool 10.

Since the abrasive functional particles 16 are configured, for example, as a "mono-layer" in combination with the thermoplastic binder 18 as the abrasive surface coating 14, an extremely dimensionally stable abrasive tool 10 can be realized which, moreover, has extremely good gliding properties on the workpiece to be machined, i.e. the abrasive tool 10 can be guided over the surface to be machined of the workpiece to be machined with relatively little effort.

The deposited thermoplastic binder 18 can further provide a protective effect for the carrier 12 or the carrier material, such as in the case of a foam carrier material.

Further, the deposited thermoplastic binder 18 can help to ensure that the grinding dust, i.e. the material removed from the workpiece to be machined, can be removed or sucked off relatively easily, so that the abrasive grinding tool 10 is essentially not clogged, and thus a long service life of the abrasive grinding tool 10 can be achieved.

Further, there is the possibility of planar suction of the grinding dust using an open-pored carrier 12, e.g., a PUR foam or a flow material (=open-pored fabric), through the abrasive grinding tool 10. Here, the abrasive grinding tool 10 can be arranged on a machining arrangement provided with a suction device, for example by means of a Velcro fastener or another air-permeable connection. The abrasive grinding tool 10 can thus be configured to be permeable to an air flow and to abrasive particles (grinding dust).

The thickness of the open-pored carrier 12 may, for example, be in a range between 0.5 mm and 12 mm, wherein the thinner the carrier 12 is configured, the higher the suction power will generally be.

The coated abrasive tool 10 can be configured as a grinding tool, a polishing tool, a cleaning or grinding pad or a cleaning body. Further, the coated abrasive tool 10 can be configured as a brush, for example, wherein the abrasive surface coating is arranged on an upper or front side of a brush setting (=bristles) of the brush.

The coated abrasive tool 10 can be effectively used, for example, for grinding and polishing varnish surfaces without paste, e.g. in the automotive sector, for boats, etc., for machining glass (in particular with a flexible carrier 12), for grinding and polishing metal surfaces, for cleaning metal surfaces and/or for cleaning and preparing floor coverings.

According to an embodiment, the coated abrasive tool 10 can also be implemented, for example, as a windshield wiper blade, wherein the abrasive functional particles 16 are arranged with the thermoplastic binder 18 on the windshield wiper blade (not shown) and provide for improved gliding properties, reduced wear and a high removal rate, i.e. a high cleaning effect, of persistent contaminants on the windshield, such as insects, etc. Thereby, by embedding the abrasive functional particles 16 in the abrasive surface coating 14, wear of the glass material of the windshield can be avoided.

In the case of the abrasive tool 10 being formed as a windshield wiper blade, the abrasive surface coating 14 can be arranged, for example, on side surface areas and optionally on the wiper edge of the windshield wiper blade. For the abrasive functional particles 16, for example, materials can be used which have a relatively low or lower hardness, for example Mohs hardness, compared to the glass material of the windscreen. For example, in addition to the materials already mentioned, minerals, e.g. apatite, or natural materials, e.g. crushed or ground shells, nut shells, etc., can also be used for the abrasive functional particles 16.

Further, the coated abrasive tool can be produced, for example, in an extremely efficient manner using the production method described below.

According to an embodiment, the abrasive effect of the abrasive tool 10 can be adjusted by the distribution density and/or size of the abrasive functional particles 16 deposited as a monolayer on the surface area 12-A of the carrier 12.

Figure 2:
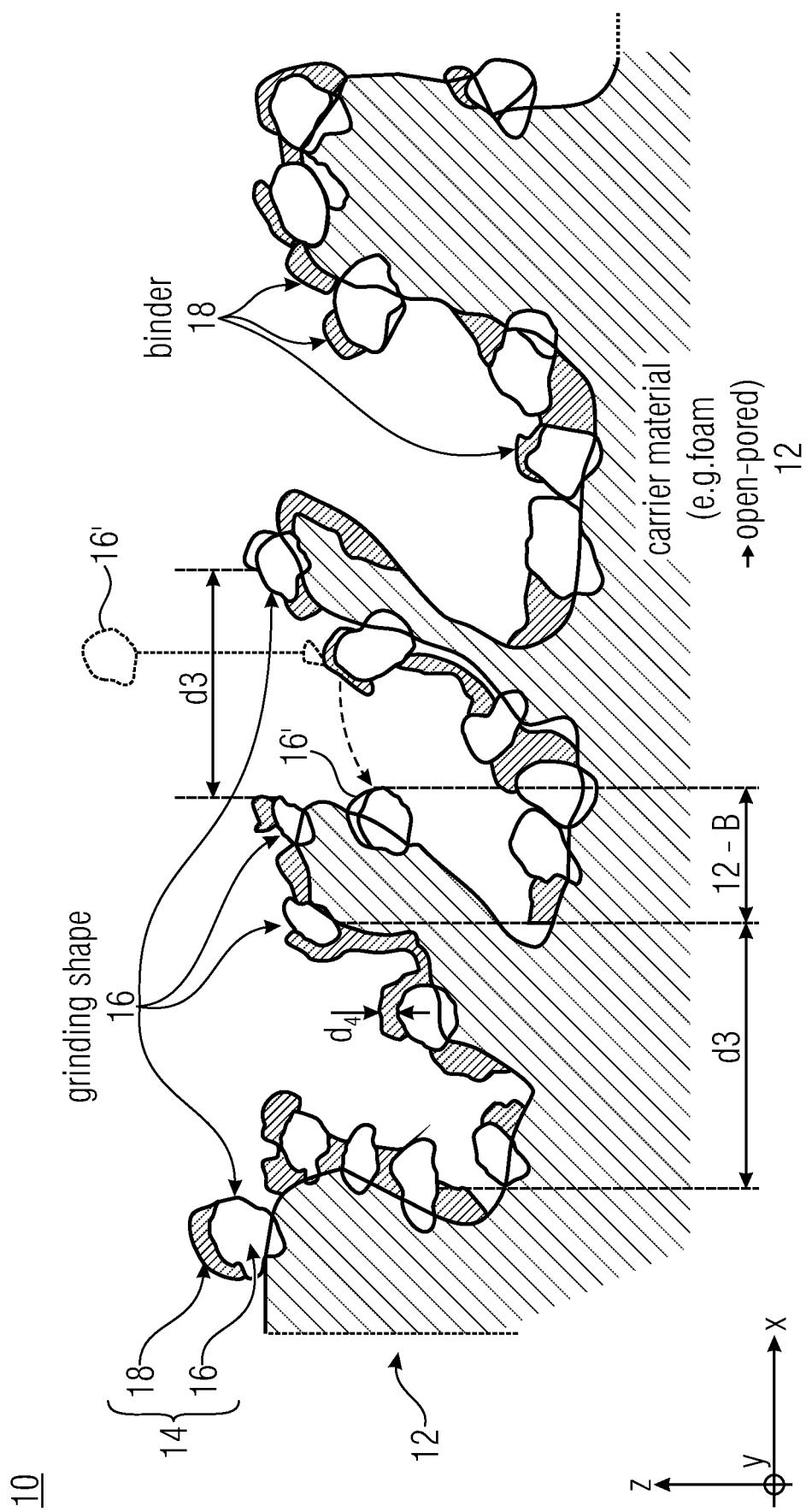
FIG. 2 shows a schematic cross-sectional view of a surface area of a coated abrasive tool comprising an open-pored substrate or carrier material, according to a further embodiment.

FIG. 2 shows a schematic cross-sectional view of a surface area 12-A of a coated abrasive tool 10 according to a further embodiment comprising an open-pored substrate or carrier material 12. As shown in FIG. 2, the substrate material 12 comprises an open-pored surface area 12-A with an average pore diameter d3, wherein the abrasive functional particles 16 comprise an average diameter or particle size d1 with d1≤½ d3 or with d1≤¼ d3. The specified size ratios can ensure that the abrasive surface coating 14 can be configured as a close-contour coating.

By arranging the abrasive functional particles 16 with the thermoplastic binder 18 as a monolayer, the abrasive surface coating 14 can be arranged extremely close to the open-pored surface area 12-A of the carrier material 12, so that when a workpiece is machined with the coated abrasive tool 10, an extremely large number of abrasive functional particles 16 can act on the surface coating of the workpiece to be machined, and thus the machining operation can be performed in an extremely effective manner.

For example, foam or fleece etc. can be used as an open-pored carrier material. A typical foam material is elastic and has a compression hardness of 20-60 according to DIN 53577 or ISO 3386. This corresponds to a pressure of 2-6 kPa at 40% compression of the foam.

As further illustrated in FIG. 2, a small number of abrasive functional particles 16', e.g. less than 20%, 10%, 2% or 1%, of the abrasive functional particles 16 can be embedded in the carrier material on the surface area 12-A of the carrier 12 and thus anchored therein (in a form-fitting and adhesive manner) without the presence of an additional thermoplastic binder 18 for an additional adhesive bond.

This situation can occur, for example, at surface areas 12-A of the carrier material 12 which have an undercut 12-B with respect to a vertical (=z-direction in FIG. 2), wherein such abrasive functional particles 16' can be brought to the embedding position in the undercut region 12-B based on the kinetic energy obtained during the coating process and by means of an elastic impact (=bouncing off) of another embedded abrasive functional particle 16.

Otherwise, the above statements with respect to the coated abrasive tool 10 of FIG. 1a-b are equally applicable to the coated abrasive tool 10 of FIG. 2. Further, the coated abrasive tool can be produced, for example, in an extremely efficient manner using the production method described below, i.e., the abrasive surface coating 14 can be configured as a close-contour coating.

Figure 3:
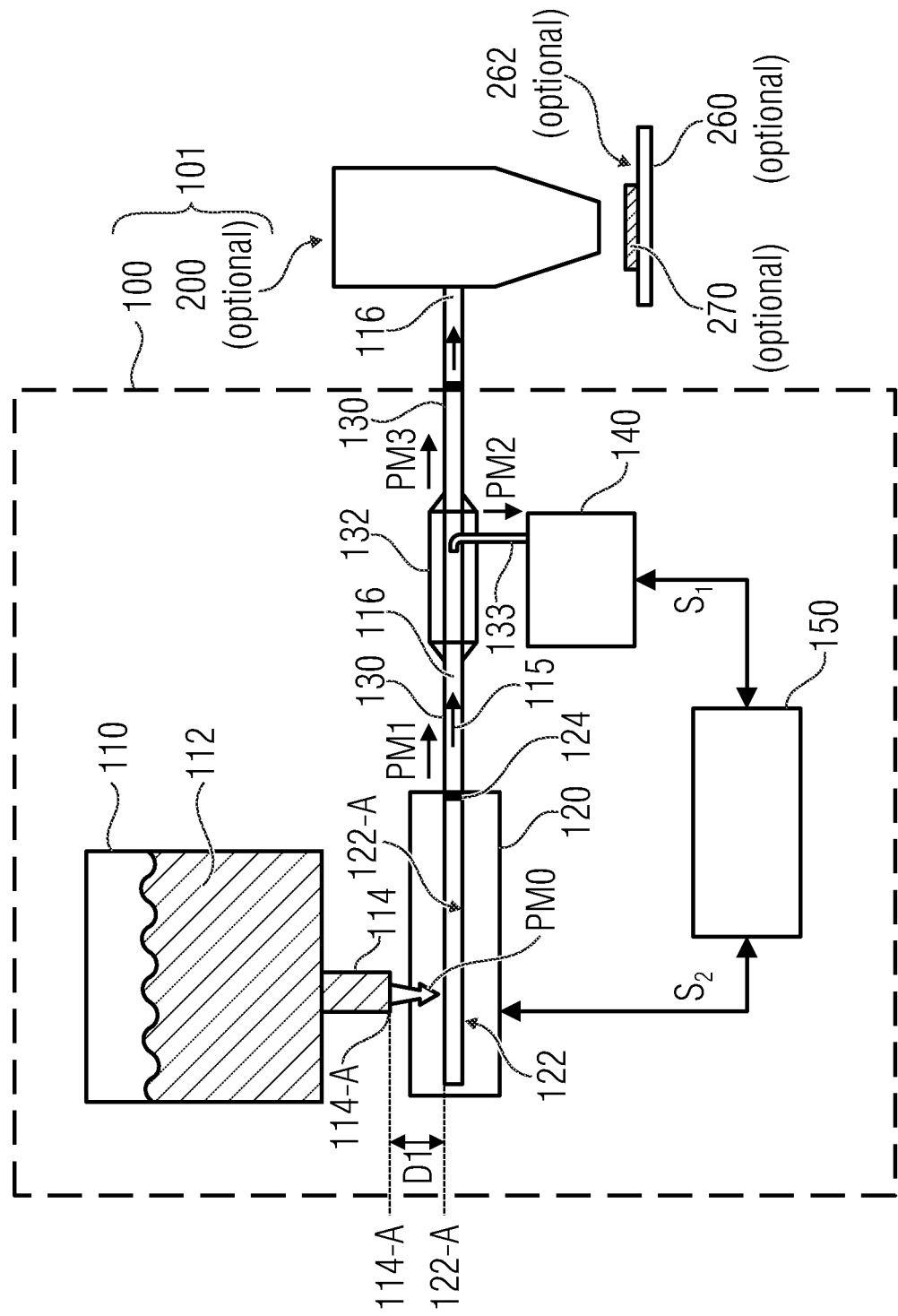
FIG. 3 shows a schematic block diagram of an apparatus or system for coating a tool with an abrasive surface coating, according to a further embodiment.

FIG. 3 shows a schematic block diagram of a device or system 100 for coating a tool 10 with an abrasive surface coating 14 in accordance with another embodiment.

According to an embodiment, an apparatus 100 for conveying and dosing powder 112 includes a powder storage container 110 for storing and providing powder 112, a conveyor 120, e.g. an oscillating conveyor, having conveying means 122 with adjustable conveying rate for delivering the powder 112 to a powder outlet 124 with the adjustable conveying rate, a conduit arrangement 130 for conveying the powder 112 delivered from the conveyor 120 in a conveying gas 115 as a powder-gas mixture 116 and for supplying the powder-gas mixture 116 to powder processing means 200, wherein decoupling means 132 are provided in the conduit arrangement 130 for removing a defined portion PM2 of the powder 112 from the powder-gas mixture 116, a powder amount measuring arrangement 140 for detecting the decoupled amount of powder PM2 per unit time and for providing a powder amount information signal S1, wherein the removed or decoupled amount of powder PM21 per unit time has a predetermined ratio to the conveyed amount of powder PM1 of the conveyor 120 within a tolerance range, and control means 150 configured to adjust the adjustable conveying rate of the conveyor 120 to a predetermined set value on the basis of the powder amount information signal S1 provided by the powder amount measuring arrangement 140.

By the extremely precise dosage of the needed amount of powder to the powder processing means, e.g., to a plasma coating arrangement or a plasma nozzle for plasma spraying, substantially any surface structures of the coated abrasive tool 10 can be coated in an extremely uniform and precise manner with the one abrasive surface coating 14, wherein further the abrasive properties of the deposited abrasive surface coating 14 can be adjusted and dimensioned in a very precise manner. Further, the deposited layer structures or the abrasive surface coating can be connected or formed integrally with the component to be coated in an integrated and/or form-fitting manner.

FIG. 3 thus shows in a schematic diagram an apparatus 100 for conveying or supplying and dosing powder 112 according to an embodiment. The apparatus 100 for conveying and dosing powder 112 comprises a powder storage container 110 for storing and providing powder 112. The apparatus 100 further comprises a conveyor 120, e.g., oscillating conveyor, comprising conveying means or a conveyor groove 122, the conveying rate of which for delivering the powder 112 to a powder outlet 124 is adjustable to provide an amount of powder PM1 per unit time (e.g., per second) at the powder outlet 124. The apparatus 100 further includes a conduit arrangement 130 for conveying the powder 112 discharged from the conveyor 120 in a conveying gas 115 as a powder-gas mixture 116 and for supplying the powder-gas mixture 116 to an (optional) powder processing means 200, which can be, for example, a plasma coating arrangement or plasma nozzle 200 for plasma spraying according to DIN 657. The conduit arrangement 130 further comprises decoupling means or a bypass 132 for decoupling or removing a defined portion or amount of powder PM2 of the powder 112 from the powder-gas mixture 116. The apparatus 100 further comprises a powder amount measuring arrangement 140 for detecting the amount of powder decoupled per unit time and for providing a powder amount information signal S1 based on the amount of powder decoupled per unit time. The decoupling means 132 is now configured such that the extracted amount of powder PM2 per unit time has a predetermined ratio to the conveyed amount of powder PM1 (total amount of powder) of the conveyor 120 within a tolerance range, and thus also has a predetermined ratio to the amount of powder PM3 (=conveyed amount of powder PM1 minus extracted amount of powder PM2) per unit time supplied by the conduit arrangement 130 to the powder processing device 200.

The apparatus 100 further comprises control means 150 configured to control, based on the powder amount information signal S1 provided by the powder amount measuring arrangement 140, the conveyor or oscillating conveyor 120 with a control signal S2 to adjust the conveying rate of the conveyor 120 to a predetermined set or target value, i.e. to the target conveying rate PM1, so that the exact dosage of the conveyed amount of powder PM1 and thus the amount of powder PM3 supplied to the powder processing means 200 can be obtained.

For the control of the conveyor 120 performed by the control means 150 to adjust the conveying rate of the conveyor 120 to a predetermined target conveying rate to provide sufficiently good supplying and dosing results, a tolerance range is introduced within which the extracted amount of powder PM2 per unit time, which is decoupled from the powder-gas mixture by means of the decoupling means 132, should be in a predetermined fixed ratio to the conveyed amount of powder or total amount of powder PM1 of the conveyor 120. Thus, a tolerance range is introduced for the predetermined ratio between the extracted amount of powder PM2 per unit time to the conveyed amount of powder PM1 per unit time of the conveyor 120. The tolerance range can thus indicate, for example, that the actual ratio of the extracted amount of powder per unit time to the conveyed total amount of powder per unit time of the conveyor 120 deviates from the predetermined ratio by less than 20%, 10%, 5%, 2%, 1% or 0.1%, or that there is no deviation or only a negligibly small deviation. The lower the tolerance range is assumed to be and can be maintained, the more accurately the control means 150 can adjust the adjustable conveying rate of the conveyor 120 to the predetermined target conveying rate.

The tolerance range can, for example, take into account varying environmental parameters, such as temperature, etc., or deviating physical properties of the powder, such as the size and/or density of the powder particles, or changes (variations) in the gas pressure or the gas temperature of the conveying gas 115 or also other environmental parameters and/or influencing variables.

According to an embodiment, the decoupling means 132 is configured to extract a predefined proportion or ratio of the amount of powder PM1 in the powder-gas mixture 116 delivered by the conveyor 120 to the powder outlet 124 and transported in the conduit arrangement 130. Here, for example, the decoupling means 132 can be provided with a decoupling path 133 as a conduit or pipe section of the conduit arrangement 130. In particular, the decoupling means 132 can be divided into different volume regions along the flow direction of the powder-gas mixture in order to obtain a homogeneous distribution of the powder-gas mixture in the decoupling means 132, so as to maintain as accurately as possible the predetermined ratio between the extracted amount of powder PM2 per unit time and the amount of powder PM1 conveyed by the conveyor 120 or the amount of powder PM3 supplied to the powder processing means 200. According to an embodiment, the decoupling means 132 can include an inlet section, an expansion section or suction section, a homogenization section, a decoupling or withdrawal section, and a discharge section or compression section in the flow direction of the powder-gas mixture.

According to an embodiment, the powder amount measuring arrangement 140 is configured to detect or determine the weight of the extracted amount of powder PM2 per unit time based on the extracted or decoupled amount of powder PM2 per unit time. Based on the detected weight of the decoupled amount of powder per unit time, the powder amount information signal S1 can then be provided by the powder amount measuring arrangement 140 to the control means 150.

According to an embodiment, the powder amount measuring arrangement 140 can be configured as a load cell or scale to "directly" measure the weight (or mass) of the decoupled amount of powder per unit time.

According to a further embodiment, the powder amount measuring arrangement 140 can be configured to optically detect the number of decoupled powder particles 112 and to provide the powder amount information signal S1 with the number of decoupled powder particles to the control means 150.

According to a further embodiment, the powder amount measuring arrangement 140 can be configured to optically detect the number and, for example, the respective size or average size of the decoupled powder particles 112 and to provide the powder amount information signal S1 with the number and (respective or average) size of the decoupled powder particles to the control means 150.

Based on the number and (respective or average) size of the decoupled powder particles, the volume of the decoupled amount of powder PM2 per unit time can be determined, wherein based on the determined volume of the decoupled amount of powder per unit time and further on the (e.g. predetermined) material density of the used powder particles, the weight of the decoupled amount of powder PM2 per unit time can be determined.

Here, the determination or calculation of the volume and/or the weight of the decoupled amount of powder PM2 per unit time can be performed in the powder amount measuring arrangement 140 or also in the control means 150.

In the optical detection of the decoupled amount of powder PM2, the powder amount information signal S1 provided by the powder amount measuring arrangement 140 can comprise at least the number of decoupled powder particles, as far as the average size and the average material density of the decoupled powder particles are known and available as information. Thus, for example, the powder amount measuring arrangement 140 or the control means 150 can perform the calculation of the weight of the decoupled amount of powder PM2 per unit time.

According to an embodiment, the control means 150 is configured to determine the current conveying rate PM1 of the conveyor 120 based on the powder amount information signal S1, and when the current conveying rate of the conveyor 120 deviates from the target conveying rate, the control means 150 is then configured to control the conveyor 120 to adjust the current conveying rate PM1 to the target conveying rate PM.

Thus, during operation of the apparatus 100 for conveying and dosing powder 12, the control means 150 can be configured to continuously adjust or track the current, adjustable conveying rate of the conveyor 120 to the desired target conveying rate.

The conveying means 122 of the conveyor 120 as an oscillating conveyor is excited to oscillate perpendicularly and parallel to a conveying direction to convey the powder or powder particles 112, wherein the oscillating conveyor 120 is configured to perform an oscillating motion of the conveying means 122 at an oscillation frequency from 1 Hz to 1 kHz or from 50 Hz to 300 Hz or above at an oscillation amplitude in a range from 1 µm to 1 mm or from 5 µm to 200 µm to obtain the adjustable conveying rate.

In accordance with an embodiment, the conveyor 120 can be configured as a piezoelectrically or magnetically driven conveyor 122, i.e., the oscillation frequency and amplitude is obtained using piezoelectric and/or magnetic actuators.

Now, according to an embodiment, the control means 150 can be configured to supply the control signal S2 to the conveyor 120 based on the powder amount information signal S1 to adjust the oscillating motion of the conveying means 122 of the conveyor 120 to obtain the target conveying rate.

According to an embodiment, the powder supply container 110 comprises an outlet device or outlet valve 114 for providing the powder to the conveying means 122. Here, for example, the provisioning rate of the powder 112 or the amount of powder PM0 per unit time from the powder supply container 110 to the conveying means 122 of the oscillating conveyor 120 depends on the adjusted distance D1 between the outlet end 114-A of the outlet means 114 and the conveying surface area 122-A of the conveying means 122.

According to an embodiment, a distance adjusting means (not shown in FIG. 3) can be provided for adjusting the distance or gap D1 between the outlet end 114-A of the outlet means 114 and the conveying surface area 122-A of the conveying means 122, for example, to provide a pre-dosing or coarse dosing of the amount of powder PM0 provided from the powder supply container 110 to the conveying means 122 of the conveyor 120.

As mentioned above, the powder processing means 200 that is provided with the powder-gas mixture 116 with the adjusted amount of powder PM3 per unit time can be configured, for example, as a plasma coating arrangement or a plasma nozzle for plasma spraying in accordance with DIN 657.

The powder conveying apparatus 100 is generally applicable to any application for dosed conveying or supplying of an aerosol to the powder processing means 200. For example, an aerosol is defined as particles or solids conveyed in a carrier gas. In addition to plasma coating or plasma spraying applications, the powder delivery apparatus 100 can further be used in laser deposition welding (cladding) processes or laser plasma coating processes.

Thus, the overall arrangement 101 illustrated in FIG. 3 for producing a layer structure 270, such as the abrasive surface coating 114, on a surface area 262 of a device 260 can include the apparatus 100 for conveying and dosing powder 112 described above and a plasma coating arrangement 200. The plasma coating arrangement 200 can include, for example, a plasma source for introducing a plasma into a process region to activate the provided powder particles in the process area with the plasma, and can further include a deposition means or outlet nozzle for depositing the activated powder particles to the surface area of the device to obtain the layer structure on the surface area of the coated abrasive tool 10.

FIG. 4 shows a schematic flow diagram of a method 300 for producing a coated abrasive tool 10 according to a further embodiment. The method 300 for producing a coated abrasive tool 10 can be performed, for example, using the apparatus 100 shown in FIG. 3 for coating a tool 10 with an abrasive surface coating 14.

According to an embodiment, the method 300 for producing a coated abrasive tool comprises a step 310 of supplying a powder mixture to a thermal spraying apparatus, for example according to DIN EN657, or low-thermal spraying apparatus, which is directed towards a surface area 12-A of a substrate 12 to be coated, wherein the powder mixture comprises abrasive functional particles and a thermoplastic binder. Here, the powder mixture comprises the functional particles 16 and the thermoplastic binder material 18 as separate powder particles, or the powder mixture has the functional particles 16 at least partially or completely coated with the thermoplastic binder material 18. Further, a reduction in the viscosity of the thermoplastic binder material 18 is effected in the thermal or low-thermal spraying apparatus.

Based on the energy input needed in the spraying apparatus, a thermal spraying apparatus 200 or a low-thermal spraying apparatus 200 is used. The influence of the energy input of the spraying apparatus 200 is based on the size of the abrasive functional particles, wherein generally applies, the larger the functional particles 16, the more energy is needed to activate the thermoplastic binder 18, i.e. to transfer the same into the melt. Further, with regard to the energy input of the spraying apparatus 200, the melting point of the "thermoplastic binder and carrier material" has to be taken into account, wherein generally applies, the higher the melting point of the carrier 12 or the thermoplastic binder 18, the more energy is needed to transfer the same into the melt.

In a step 320 of the method 300, the abrasive functional particles 16 are deposited on a surface area 12-A of the carrier 12 with the binder 18 having a reduced viscosity, wherein the thermoplastic binder 18 re-solidifies when deposited on the surface area 12-A of the carrier 12 and the abrasive surface coating 14 is formed on the carrier 12 of the abrasive tool 10 with the functional particles 16 and the thermoplastic binder 18. According to an embodiment, the thermoplastic binder 18 and the abrasive functional particles 16 are deposited (in areas) simultaneously on the surface area 12-A of the carrier 12 and are bonded to the carrier material in an integrated and/or form-fitting manner.

According to an embodiment, when depositing 320 the abrasive functional particles 16 on the surface area 12-A of the carrier 12, further partial embedding of at least part of the abrasive functional particles 16 at an embedding depth d3 of the carrier material of the carrier 12 is effected, wherein the embedding depth d3 corresponds to at least 5% (or 10%) and at most 95% (or 99%) of an average diameter d1 of the abrasive functional particles, with $0.95\ d1 \geq d2 \geq 0.05\ d1$.

This embedding of the abrasive functional particles 16 impinging on the carrier 12 in the carrier material is performed, e.g., based on the kinetic energy of the abrasive functional particles 16 obtained during the coating process.

According to an embodiment, the method 300 comprises a step 330 of adjusting the distribution density of the functional particles 16 (as a monolayer) on the surface 12-A via the portion of the abrasive functional particles 16 in the mixture of thermoplastic binder 18 and functional particles 16 supplied to the spraying apparatus 200 to deposit the abrasive functional particles (16) in combination with the thermoplastic binder (18) as a monolayer.

According to an embodiment, the method 300 comprises a step 340 of adjusting the powder conveying rate and the feed over the carrier surface 12-A such that when the abrasive functional particles 16 and the thermoplastic binder 18 are deposited, at least 60% of the area of the abrasive surface coating 14 is formed as a monolayer of the abrasive functional particles 16 in combination with the thermoplastic binder (18) on the surface area 12-A of the carrier 12, i.e., in a single layer.

According to an embodiment, the carrier 12 comprises an open-pored surface area 12-A with an average pore diameter d3, wherein the functional particles 16 have an average diameter d1 with $d1 \leq \frac{1}{2}\ d3$ or $d1 \leq \frac{1}{4}\ d3$ to effect an adhesive bond of the abrasive surface coating, which closely follows the topography of the open-pored surface area, as a monolayer to the open-pored carrier surface.

According to an embodiment, the carrier material comprises cork, textile, rubber, rubber, elastomer, PVC, PUR, paper, latex, PE, PA, PET, PC, SBR, PTHF, carbonate, a foam material, a bristle material of a brush and/or a foil material. According to an embodiment, the abrasive functional particles are formed as hard particles and comprise corundum, zirconium corundum, silicon carbide, boron nitride, glass, minerals (apatite), natural materials (shells) or diamond with a particle size between 100 nm and 2 mm, wherein the thermoplastic binder can comprise PE, PA, PC, ABS, PVC, PET, PEEK, PTFE, PUR, PMMA or PTHF.

In the present method 300 for producing a coated abrasive tool 10, first, the starting material for coating is provided, wherein the abrasive functional particles 16 (=cutting materials) are mixed with a thermoplastic binder material or polymer material 18. Here, the abrasive functional particles can already be bound with the thermoplastic binder material or, alternatively (or additionally), the abrasive functional particles 16 and the thermoplastic binder material 18 (e.g. polymer particles) can be supplied homogeneously distributed to the spraying apparatus 200. For example, the concentration of the polymeric material can be in a range between 5% and 95% (MP). The bonding of the starting material, i.e. the abrasive functional particles 16 and the thermoplastic binder 18, to the carrier 12 is performed by a thermokinetic process. Optionally, after the abrasive surface coating 14 has been deposited on the carrier 12, a thermal pressing process (for exerting mechanical pressure) can still be performed under increased temperature.

Referring now to FIGS. 5*a-b* and 6*a-b*, a plurality of configurations of the coated abrasive tool 10 as an abrasive dental product 50, e.g., a dental cleaning product, a dental grinding product, or a dental polishing product, are illustrated and explained below. As will be explained below, the abrasive dental product 50 comprises the coated abrasive tool 10 as a processing element or active element.

A number of different possible implementations of the coated abrasive tool 10, e.g. in an abrasive dental product 50, will be described below by way of example. In the present description of the embodiments, elements having the same technical structure and/or the same technical function have the same reference number or the same name, wherein a detailed description of such elements will not be repeated for each embodiment. Thus, the above description with respect to FIGS. 1*a-b*, 2, 3 and 4 is equally applicable to the further embodiments as described below. In the following description, the differences, e.g. additional elements or additional functionalities, with respect to the embodiments described above and the resulting technical effects will essentially be discussed.

Figure 5A:
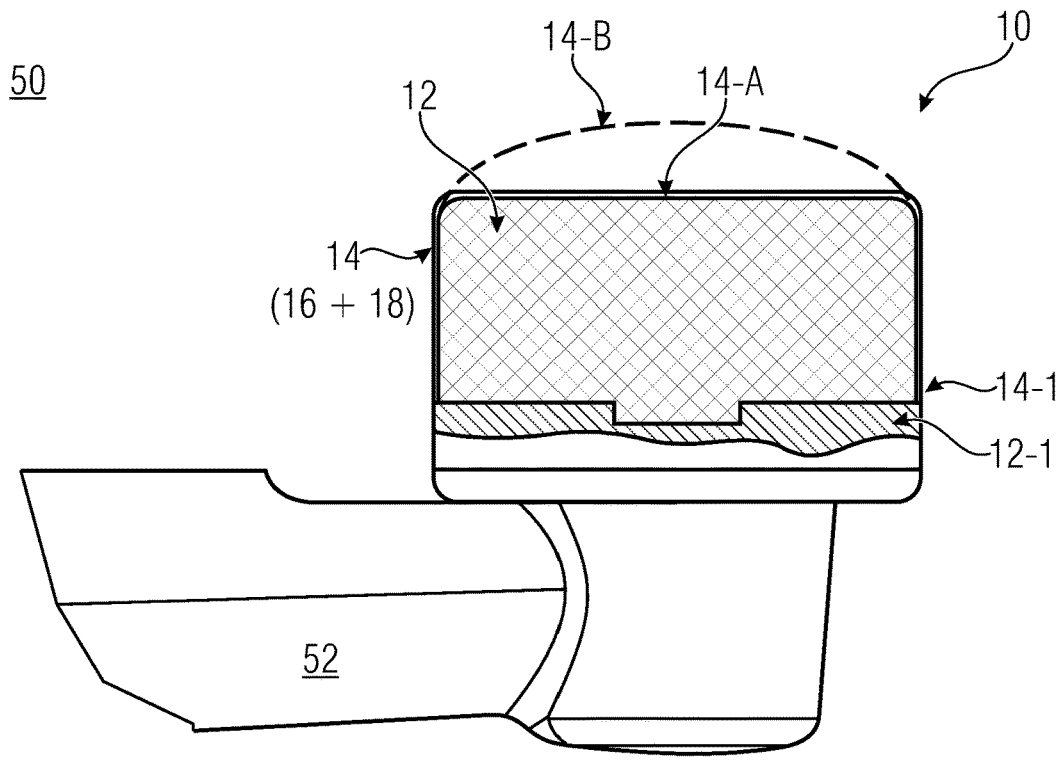
FIG. 5a-b show a schematic side view and a sectional view of an abrasive dental product in the form of a toothbrush head according to a further embodiment.
Figure 5B:
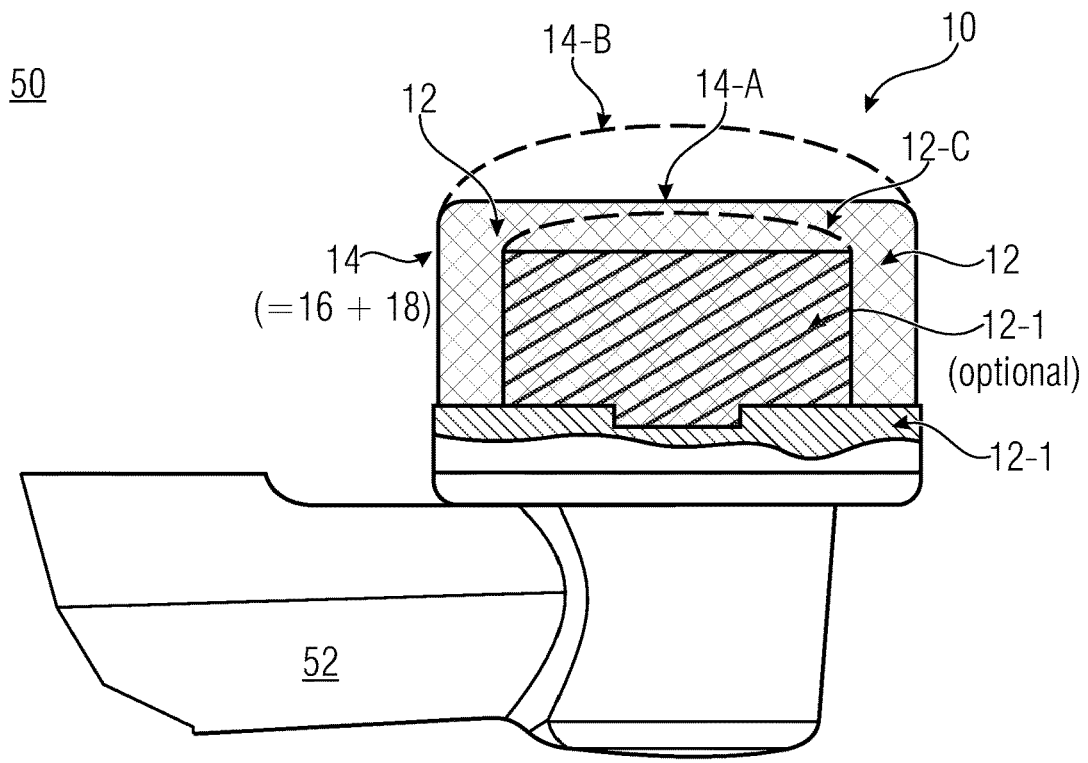

FIGS. 5*a-b* show a schematic side view and sectional view of an abrasive dental product 50 in the form of a dental cleaning product or toothbrush head 52 according to a further embodiment.

According to the embodiment of the abrasive dental product 50, the carrier 12 can comprise a foam material as the carrier material, wherein the abrasive surface coating 14 is disposed on a surface area 12-A of the foam material. The abrasive surface coating 14 in turn comprises the abrasive functional particles 16 and the thermoplastic binder 18, wherein the abrasive functional particles 16 are deposited as a monolayer. The foam material of the carrier 12 can, for example, have an open-pored structure and can further be elastically deformable.

According to an embodiment, the abrasive dental product 50 is configured as a dental cleaning product, wherein the coated abrasive tool 10 is arranged as a cleaning grinding pad (=cleaning pad) on the abrasive dental cleaning product 50. The dental cleaning product 50 can be a toothbrush head 52 of an electric or manual toothbrush, wherein the coated abrasive tool 10 is arranged as a cleaning grinding pad on the toothbrush head 52.

According to an embodiment, a support structure 12-1 for the carrier material of the cleaning grinding pad 10 is provided on the dental cleaning product 50. Thus, the carrier 12 can comprise the support structure 12-1 on which the carrier material is arranged, wherein the carrier material is mechanically mounted to the support structure 12-1 and surrounds the support structure 12-1 in areas or in a cap-like manner.

The support structure 12-1 can be configured, for example, in a manner permeable to air (at least in areas), in order to also make the carrier material of the carrier 12 accessible on both sides for drying or hygiene treatment (e.g. with a disinfectant). The cleaning grinding pad 10 can be interchangeably or fixedly arranged on the support structure 12-1. Thus, the support structure 12-1 can be further provided for, for example, a fixed or releasable mechanical fixation of the cleaning grinding pad 10 to the dental product 50. Further, the cleaning grinding pad 10 can in turn be mechanically fixed or mounted to the support structure 12-1 in a fixed or also releasable manner.

According to an embodiment, the foam material of the carrier 12 can be a solid foam material having a thickness of, for example, about 10 mm±1 mm (solid body—see FIG. 5*a*) or an alternative relatively thin layer having a thickness of, for example, about 2 mm±0.2 mm (FIG. 5*b*).

According to an embodiment, the coated abrasive tool 10 configured as a cleaning grinding pad can have, for example, a flat grinding surface 14-A or an outwardly curved (convex) grinding surface (dotted line) 14-B. In the case of an outwardly curved (convex) grinding surface (dotted line) 14-B, the carrier 12 can also have a correspondingly adapted outwardly curved (convex) surface contour (dotted line) 12-C to support the carrier material.

According to an embodiment, the foam material of the carrier 12 can be configured to receive a cleaning fluid, wherein the delivery of the cleaning fluid (i.e., a liquid or gel) during use is adjustable based on the porosity of the foam material and the viscosity of the cleaning fluid.

According to an embodiment, the abrasive functional particles 16 can also comprise a (further) thermoplastic material, wherein the thermoplastic material of the abrasive functional particles 16 is harder than the thermoplastic binder 18.

According to an embodiment, the abrasive surface coating 14 can comprise an additional material in the form of nanoparticles or microparticles having an antibacterial and/or antiviral effect. The antibacterial and/or antiviral nanoparticles or microparticles can be deposited on the abrasive surface coating 14 in the thermoplastic binder 18 and/or an additional antibacterial and/or antiviral layer 14-1.

Figure 6A:
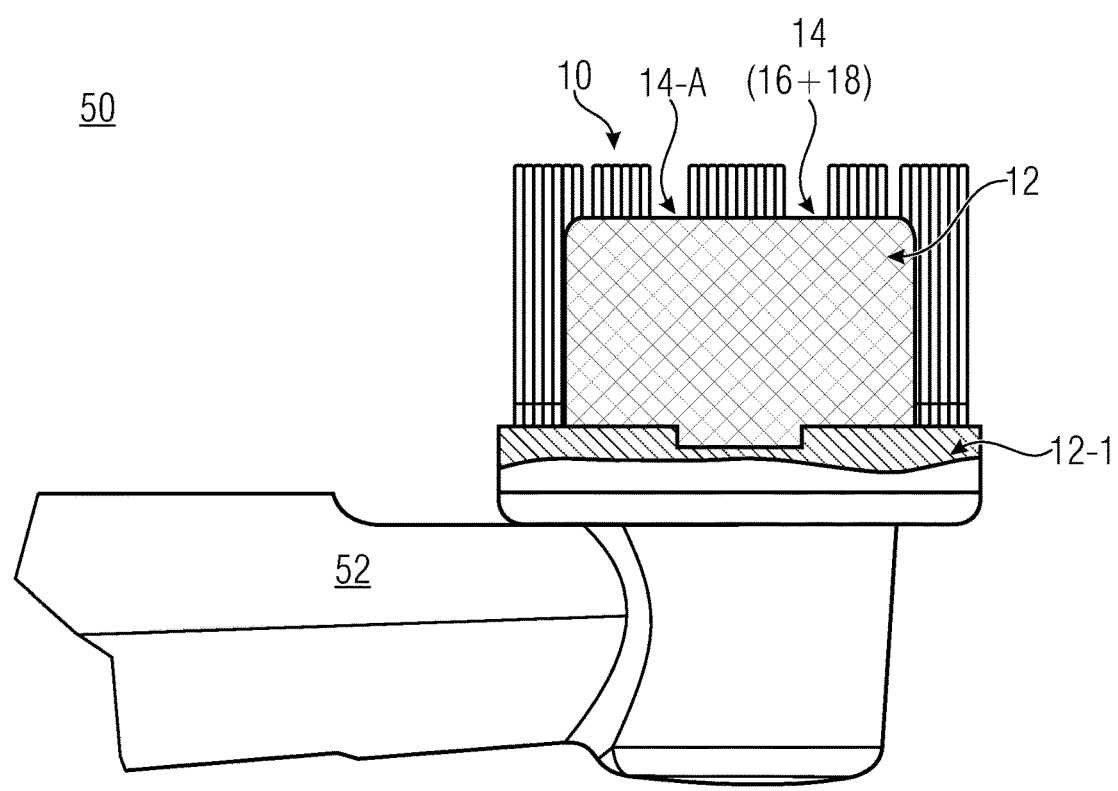
FIG. 6a-b show schematic side view and sectional view of an abrasive dental product in the form of a toothbrush head according to a further embodiment.
Figure 6B:
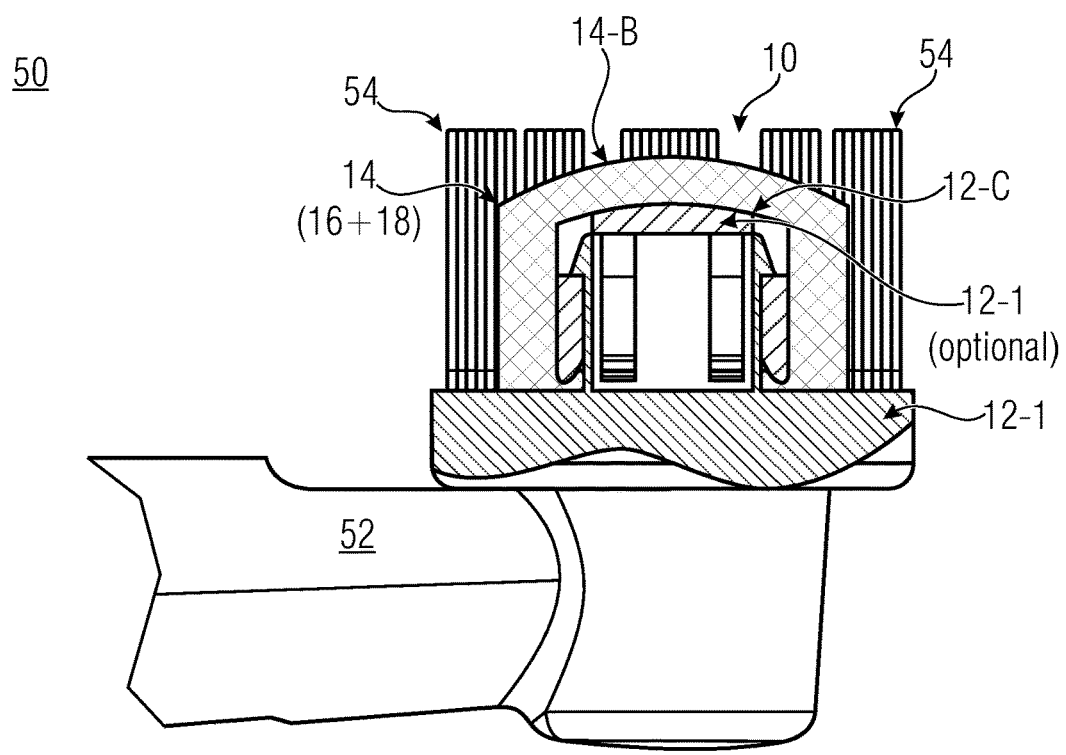

FIGS. 6*a-b* show a schematic side view and sectional view of an abrasive dental product 50 in the form of a dental cleaning product or toothbrush head 52 according to a further embodiment is shown.

According to an embodiment, the toothbrush head 52 can comprise both the cleaning grinding pad 10 and further comprise cleaning bristles 54, which can be laterally adjacent to the cleaning grinding pad 10 or laterally surrounding the cleaning grinding pad 10. The cleaning grinding pad 10 can again be interchangeably or fixedly arranged on the support structure 12-1.

In FIG. 6*a*, for example, the cleaning grinding pad has a flat grinding surface 14-A. In FIG. 6*b*, for example, the cleaning grinding pad has an outwardly curved (convex) grinding surface 14-B.

In accordance with the embodiments of abrasive dental product 50 shown in FIGS. 5*a-b* and 6*a-b*, an exemplary dental cleaning product in the form of a toothbrush head 52 has been described, and some technical effects of the various configurations will be described below.

According to an embodiment, the toothbrush head 52 comprises only the cleaning pad (cleaning or polishing pad) 10, wherein the toothbrush head 52 can further comprise optional bristles 54 arranged laterally to the cleaning pad 10. The cleaning pad 14 thus has the cleaning and smoothing function for the teeth, while the optional bristles can additionally serve to clean the interdental spaces.

The additional antibacterial and/or antiviral material 14-1 in the form of the nanoparticles and/or microparticles can comprise, for example, Ag particles, Cu particles, Zn particles, or alloys thereof, and can be embedded in or disposed on the thermoplastic binder 18.

For example, diamond (industrial diamond) can be used as abrasive functional particles 16, wherein the grain sizes (average diameter d1) can vary depending on the intended use of the dental cleaning product.

If the dental cleaning product 50 is configured for daily use, the particle size can be in a range from 0.5 to 5.0 µm, from 2 to 4 µm, or at about 3 µm±0.5 µm. If weekly use of the dental cleaning product is intended, the particle size d1 can be in a range from 5 to 15 µm, from 7 to 11 µm, or 9 µm±1 µm. For example, if monthly use of the dental cleaning product 50 is intended for tooth cleaning, the average particle size d1 can be 15 to 25 µm, 17 to 23 µm, or 20±2 µm.

The coated abrasive tool or cleaning pad 10 comprises, for example, a foam material (sponge) as the carrier material of the carrier 12, which is, for example, open-pored. Such a foam material of the cleaning pad 10 is particularly suitable for receiving very low viscosity fluids, e.g., liquid or gel-like cleaning additive products (toothpaste), and for dispensing or releasing the same in a dosed manner after the foam material has absorbed or been impregnated with the fluid. A lower viscosity of the gel (compared to a conventional toothpaste) generally results in improved distribution during application. By being formed as a foam pad, the abrasive tool 10 can receive any gels or fluids, which can include fragrances, essential oils, fluorides, medications, and/or anti-inflammatory additives.

The average porosity of the carrier material of the carrier 12, i.e. the foam material, allows the delivery or dosage of the cleaning additive to be controlled, i.e. to be provided relatively evenly for a relatively long period of time during the cleaning process, for example during the entire tooth brushing process. Thus, the cleaning pad 10 fulfills a double effect of double use in that the abrasive surface coating 14 results in cleaning of the surfaces of the teeth, while the foam material can provide fluid application. In particular, substantially liquid additive cleaning agents can be used, for example, which can be hygienically received from a fluid dispenser in a substantially non-contact manner.

As further discussed above, the support structure 12-1 can be provided to mechanically fix the carrier 12 of the cleaning pad 10, wherein the cleaning pad 10 can surround the support structure 12-1 in areas or in a cap-shaped manner to provide the planar or outwardly curved (convex) grinding surface 14-1, 14-2 of the cleaning pad 10. By the thickness of the foam material (=carrier material 12) of the carrier 12 adjacent to the support structure 12-1, the resulting hardness of the cleaning pad 10 is adjustable, i.e. the greater the thickness of the foam material adjacent to the support structure 12-1 in the area of the cleaning or grinding surface 14-1, 14-2, the softer the cleaning pad 10 (assuming a constant foam material). Further, the support structure 12-1 is also effective as a mechanical (fixed or removable) holder for the cleaning pad 10.

Based on the resulting hardness and the resulting deformation of the cleaning pad 10 when pressed against the object to be cleaned, e.g. the teeth, a higher cleaning effect can be obtained with a low deformation due to an optimal force transfer of the abrasive surface coating 14 to the object to be cleaned.

Further, the cleaning pad 10 can be configured to be replaceable, i.e., attachable to the support structure 12-1, or can be configured to be mechanically fixed to the support structure, for example, as a disposable article.

The relatively thin configuration of the foam material of the cleaning pad 10, e.g., in a range from 1 to 3 mm, or from 1.5 to 2.5 or from 2±0.2 mm results in a relatively fast and hygienic drying process after use of the cleaning pad 10, compared to a cleaning pad with a foam solid material (solid body). Since the support structure 12-1 can also be formed to be permeable to air, in order to make the carrier material of the carrier 12 accessible on both sides for drying or hygienic treatment, e.g., with a disinfectant.

Further, many thermoplastic materials are approved for medical applications, oral hygiene, etc.

The abrasive dental product 50 can further be used as a polishing and/or grinding tool for dental reworking operations in a CNC milling machine (CNC=computerized numerical control).

In the following, a summary of embodiments of the coated abrasive tool 10, the method 300 for producing the same and the abrasive dental product will be illustrated.

According to one aspect, a coated abrasive tool comprises: a carrier comprising a carrier material and an abrasive surface coating on a surface area of the carrier, the abrasive surface coating comprising abrasive functional particles and a thermoplastic binder for an adhesive bond between at least part of the abrasive functional particles and the carrier material, wherein at least part of the abrasive functional particles on the surface area of the carrier is at least partially embedded in the carrier material and bonded to the carrier material, and wherein at least part of the abrasive functional particles on the surface area of the carrier is further embedded in the thermoplastic binder, the thermoplastic binder being bonded to the abrasive functional particles and the carrier material in an integrated and/or form-fitting manner.

According to a further aspect, the abrasive functional particles have an average diameter d1, wherein at least part of the abrasive functional particles of the abrasive surface coating are embedded in an embedding depth d2 of the carrier material, wherein the embedding depth d2 is at least 5% (or 10%) and at most 95% of the average diameter d1 of the abrasive functional particles.

According to a further aspect, at least 60% of the area of the abrasive surface coating is covered with a monolayer of the abrasive functional particles on the surface area of the carrier.

According to a further aspect, the average thickness d4 of the deposited thermoplastic binder is smaller than the average diameter d1 of the abrasive functional particles and the abrasive functional particles protrude from the thermoplastic binder.

According to a further aspect, the surface area of the carrier is profiled and has knobs, a pyramid shape, a truncated pyramid shape, a cone shape, a truncated cone shape, groove structure, helical structure (=spiral structure) or, in cross-section, a wave shape. The abrasive functional particles are configured as a monolayer in combination with the thermoplastic binder.

According to a further aspect, the carrier material comprises an open-pored surface area having an average pore diameter d3, wherein the functional particles have an average diameter d1 with d1≤½ d3. The abrasive functional particles are formed as a monolayer in combination with the thermoplastic binder.

According to a further aspect, the carrier material comprises cork, textile, rubber, elastomer, PVC, PUR, paper, latex, PE, PA, PET, PC, SBR, PTHF, carbonate, a foam material, a sheet material, and/or a bristle material of a brush.

According to a further aspect, the abrasive functional particles are hard particles and comprise corundum, zirconia corundum, silicon carbide, boron nitride, glass, minerals (apatite), natural materials (shells) or diamond with a particle size between 100 nm and 2 mm.

According to a further aspect, the thermoplastic binder comprises PE, PA, PC, ABS, PVC, PET, PEEK, PTFE, PUR, PMMA or PTHF.

According to a further aspect, the coated abrasive tool is configured as a grinding tool, a polishing tool, a cleaning tool, or a brush.

According to a further aspect, the abrasive effect of the abrasive tool is adjusted by the distribution density of the functional particles on the surface area of the carrier.

According to a further aspect, the coated abrasive tool comprises an additional surface covering material on the existing abrasive surface coating, wherein the surface covering material has a dry lubricant property.

According to one aspect, a method for producing a coated abrasive tool comprises the steps of: supplying a powder mixture to a thermal [DIN EN657] or low-thermal plasma spraying apparatus directed onto a surface area of a carrier to be coated, wherein the powder mixture comprises abrasive functional particles and a thermoplastic binder, wherein the powder mixture comprises the functional particles and the thermoplastic binder material as separate powder particles, or wherein the powder mixture comprises the functional particles at least partially or completely coated with the thermoplastic binder, and wherein a reduction in the viscosity of the binder is effected in the thermal or low-thermal plasma spraying apparatus, and depositing the functional particles with the binder having a reduced viscosity to a surface area of the carrier, wherein the thermoplastic binder re-solidifies when being deposited on the surface area of the carrier and the abrasive surface coating is formed on the carrier of the abrasive tool with the functional particles and the thermoplastic binder.

According to a further aspect, when depositing the abrasive functional particles on the surface area of the carrier, further, partial embedding of at least part of the abrasive functional particles in an embedding depth $d2$ of the carrier material of the carrier is effected, wherein the embedding depth $d2$ corresponds to at least 5% and at most 95% of an average diameter $d1$ of the abrasive functional particles, with $0.95\ d1 \geq d2 \geq 0.05\ d1$.

According to a further aspect, the method further comprises adjusting the distribution density of the functional particles on the surface via the portion of the abrasive functional particles in the mixture of thermoplastic binder and functional particles supplied to the plasma spraying apparatus. The abrasive functional particles are configured as a monolayer in combination with the thermoplastic binder.

According to a further aspect, the method further comprises: adjusting the powder conveying amount and the feed over the carrier surface such that when depositing the abrasive functional particles and the thermoplastic binder, at least 60% of the area of the abrasive surface coating in combination with the thermoplastic binder is configured as a monolayer of the abrasive functional particles on the surface area of the carrier.

According to a further aspect, the carrier comprises an open-pored surface area having an average pore diameter $d3$, wherein the functional particles have an average diameter $d1$ with $d1 \leq ¼\ d3$ to effect an adhesive bond of the abrasive surface coating following the topography of the open-pored surface area in a close-contour manner as a monolayer on the open-pored carrier surface.

According to a further aspect, the carrier material comprises cork, textile, rubber, elastomer, PVC, PUR, paper, latex, PE, PA, PET, PC, SBR, PTHF, carbonate, a foam material, a bristle material of a brush, and/or a foil material.

According to a further aspect, the abrasive functional particles are hard particles and comprise corundum, zirconia corundum, silicon carbide, boron nitride, glass, minerals (apatite), natural materials (shells) or diamond having a particle size between 100 nm and 2 mm, and the thermoplastic binder comprises PE, PA, PC, ABS, PVC, PET, PEEK, PTFE, PUR, PMMA or PTHF.

According to a further aspect, the method further comprises depositing an additional material as a surface covering material on the existing abrasive surface coating, wherein the additional material is deposited simultaneously with the thermoplastic binder or subsequently to the thermoplastic binder on the surface area of the carrier provided with the abrasive functional particles.

According to a further aspect, the thermoplastic binder and the abrasive functional particles are deposited simultaneously on the surface area of the carrier.

According to a further aspect, an abrasive dental product comprises the coated abrasive tool.

According to one aspect, the carrier comprises a foam material as the carrier material, wherein the abrasive surface coating is arranged on a surface area of the foam material.

According to one aspect, the foam material is open-pored and elastically deformable.

According to one aspect, the carrier comprises a support structure where the carrier material is disposed, wherein the carrier material is mechanically mounted to the support structure and surrounds the support structure in areas or in a cap-like manner.

According to one aspect, the coated abrasive tool is formed as a cleaning grinding pad having a flat grinding surface or an outwardly curved (convex) grinding surface.

According to one aspect, the foam material is configured to receive a cleaning fluid, wherein the delivery of the cleaning fluid in use is adjustable based on the porosity of the foam material and the viscosity of the cleaning fluid.

According to one aspect, the abrasive dental product is a dental cleaning product, wherein the coated abrasive tool is arranged as a cleaning grinding pad or cleaning pad on the dental cleaning product.

According to one aspect, the dental cleaning product is a toothbrush head of an electric or manual toothbrush, wherein the coated abrasive tool is arranged as a cleaning grinding pad on the toothbrush head.

According to one aspect, the toothbrush head comprises the cleaning grinding pad and further comprises cleaning bristles laterally adjacent to or laterally surrounding the cleaning grinding pad.

According to one aspect, the cleaning grinding pad is interchangeably or fixedly arranged on the support structure.

According to one aspect, the abrasive functional particles comprise a thermoplastic material.

According to one aspect, the thermoplastic material of the abrasive functional particles is harder than the thermoplastic binder.

According to one aspect, the abrasive surface coating comprises an additional material in the form of nanoparticles or microparticles having an antibacterial and/or antiviral effect.

According to one aspect, the dental cleaning product is configured as a dental polisher, a dental drill attachment having a polishing and/or smoothing surface, or a dental polishing pen.

Although some aspects of the present disclosure have been described as features in the context of an apparatus, it is clear that such a description can also be considered as a description of corresponding method features. Although some aspects have been described as features related to a method, it is clear that such a description can also be considered as a description of corresponding features of an apparatus or functionality of an apparatus.

In the foregoing detailed description, various features have been grouped together in examples in part to streamline the disclosure. This type of disclosure should not be interpreted as an intent that the claimed examples have more features than are expressly stated in each claim. Rather, as the following claims reflect, subject matter can be found in fewer than all of the features of a single disclosed example. Consequently, the following claims are hereby incorporated into the detailed description, and each claim can stand as its own separate example. While each claim can stand as its own separate example, it should be noted that although dependent claims in the claims refer back to a specific combination with one or more other claims, other examples also include a combination of dependent claims with the subject matter of any other dependent claim or a combination of any feature with other dependent or independent claims. Such combinations are encompassed unless it is stated that a specific combination is not intended. It is further intended that a combination of features of a claim with any other independent claim is also encompassed, even if that claim is not directly dependent on the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A coated abrasive tool, comprising:
   a carrier comprising a carrier material, and
   an abrasive surface coating on a surface area of the carrier,
      wherein the abrasive surface coating comprises abrasive functional particles and a thermoplastic binder for an adhesive bond between at least part of the abrasive functional particles and the carrier material,
   wherein at least part of the abrasive functional particles on the surface area of the carrier is partially embedded in and bonded to the carrier material,
   wherein at least part of the abrasive functional particles on the surface area of the carrier is further partially embedded in the thermoplastic binder, wherein the thermoplastic binder is bonded to the abrasive functional particles and the carrier material, and
   wherein an average thickness $d4$ of the deposited thermoplastic binder is smaller than an average diameter $d1$ of the abrasive functional particles and the abrasive functional particles protrude from the thermoplastic binder.

2. The coated abrasive tool according to claim 1, wherein the abrasive functional particles comprise the average diameter $d1$, wherein at least part of the abrasive functional particles of the abrasive surface coating is embedded in an embedding depth $d2$ of the carrier material, wherein the embedding depth $d2$ corresponds to at least 5% and at most 95% of the average diameter $d1$ of the abrasive functional particles.

3. The coated abrasive tool according to claim 1, wherein at least 60% of the area of the abrasive surface coating is covered with a monolayer of the abrasive functional particles on the surface area of the carrier.

4. The coated abrasive tool according to claim 1, wherein the surface portion of the carrier is profiled and comprises knobs, a pyramid shape, a truncated pyramid shape, a cone shape, a truncated cone shape, groove structure, spiral structure or in cross-section a wave shape, wherein the abrasive functional particles are configured as a monolayer in combination with the thermoplastic binder.

5. The coated abrasive tool according to claim 1, wherein the carrier material comprises an open-pored surface area with an average pore diameter $d3$, wherein the functional particles comprise an average diameter $d1$ with $d1 \leq \frac{1}{4} d3$, wherein the abrasive functional particles are configured as a monolayer in combination with the thermoplastic binder.

6. The coated abrasive tool according to claim 1, wherein the carrier material comprises cork, textile, rubber, elastomer, polyvinyl chloride, polyurethane, paper, latex, polyethylene, polyamide, polyethylene terephthalate, polycarbonate, styrene-butadiene rubber, polytetrahydrofuran, carbonate, a foam material, a bristle material of a brush and/or a foil material.

7. The coated abrasive tool according to claim 1, wherein the abrasive functional particles are configured as hard particles and comprise corundum, zirconia corundum, silicon carbide, boron nitride, glass, minerals, natural materials or diamond with a particle size between 100 nm and 2 mm.

8. The coated abrasive tool according to claim 1, wherein the thermoplastic binder comprises polyethylene, polyamide, polycarbonate, acrylonitrile butadiene styrene, polyvinyl chloride, polyethylene terephthalate, polyether ether ketone, polytetrafluoroethylene, polyurethanes, polymethyl methacrylate or polytetrahydrofuran.

9. The coated abrasive tool according to claim 1, wherein the coated abrasive tool is configured as a grinding tool, a polishing tool, a cleaning body or a brush.

10. The coated abrasive tool according to claim 1, wherein the abrasive effect of the abrasive tool is adjusted via the distribution density and/or size of the abrasive functional particles on the surface area of the carrier.

11. The coated abrasive tool according to claim 1, further comprising:
   an additional surface covering material on the existing abrasive surface coating, the additional surface covering material comprising a dry lubricant property.

12. A coated abrasive tool, comprising:
   a carrier comprising a backing material, and
   an abrasive surface coating on a surface area of the carrier,
      wherein the abrasive surface coating comprises grinding grains and a thermoplastic binder for an adhesive bond between at least part of the grinding grains and the carrier material,
   wherein at least part of the grinding grains is partially embedded in the carrier material on the surface area of the carrier and is connected to the carrier material in a form-fitting manner,
   wherein at least part of the grinding grains on the surface area of the carrier is further partially embedded in the thermoplastic binder, wherein the thermoplastic binder is connected to the grinding grains and the carrier material in an integrated and/or form-fitting manner, wherein the grinding grains comprise an average diameter d1, wherein at least part of the grinding grains of the abrasive surface coating is embedded in an embedding depth d2 of the carrier material, wherein the embedding depth d2 corresponds to at least 5% and at most 95% of the average diameter d1 of the grinding grains, wherein at least 60% of the area of the abrasive surface coating is covered with a monolayer of the grinding grains on the surface area of the carrier, and wherein the average thickness d4 of the deposited thermoplastic binder is smaller than the average diameter d1 of the grinding grains and the grinding grains protrude from the thermoplastic binder.

* * * * *